(12) United States Patent
Middelfart et al.

(10) Patent No.: US 7,774,295 B2
(45) Date of Patent: Aug. 10, 2010

(54) DATABASE TRACK HISTORY

(75) Inventors: Morten Middelfart, Hjørring (DK); Tommy Jensen, Hjørring (DK)

(73) Assignee: Targit A/S, Hjorring (DK)

(*) Notice: Subject to any disclaimer, the term of this patent is extended or adjusted under 35 U.S.C. 154(b) by 541 days.

(21) Appl. No.: 10/991,302

(22) Filed: Nov. 17, 2004

(65) Prior Publication Data
US 2006/0106843 A1    May 18, 2006

(51) Int. Cl.
G06F 7/00 (2006.01)
G06F 17/30 (2006.01)

(52) U.S. Cl. .......................... 707/1; 707/200

(58) Field of Classification Search ............... 707/1–10, 707/100–104.1, 200–206; 704/1, 9, 10; 715/237
See application file for complete search history.

(56) References Cited

U.S. PATENT DOCUMENTS

| | | | |
|---|---|---|---|
| 4,800,510 A | 1/1989 | Vinberg et al. |
| 5,611,034 A | 3/1997 | Makita |
| 5,692,181 A | 11/1997 | Anand et al. |
| 5,884,302 A | 3/1999 | Ho |
| 5,911,138 A | 6/1999 | Li et al. |
| 5,940,518 A | 8/1999 | Malloy et al. |
| 6,108,657 A | 8/2000 | Shoup et al. |
| 6,160,549 A | 12/2000 | Touma et al. |
| 6,226,647 B1 | 5/2001 | Venkatasubramanian et al. |
| 6,415,298 B1 | 7/2002 | Oesterer et al. |
| 6,418,441 B1 | 7/2002 | Call |
| 6,490,590 B1 | 12/2002 | Fink |
| 6,615,172 B1 | 9/2003 | Bennett et al. |
| 6,625,617 B2 | 9/2003 | Yarnall et al. |
| 6,643,635 B2 | 11/2003 | Nwabueze |
| 6,647,363 B2 | 11/2003 | Claassen |
| 6,671,689 B2 | 12/2003 | Papierniak |
| 6,775,675 B1 | 8/2004 | Nwabueze et al. |
| 6,816,879 B1 | 11/2004 | Kiritzov et al. |
| 6,873,993 B2 | 3/2005 | Charlesworth et al. |
| 6,889,230 B1 | 5/2005 | Rogers |
| 7,010,523 B2 | 3/2006 | Greenfield et al. |

(Continued)

FOREIGN PATENT DOCUMENTS

EP    0 961 439    12/1999

(Continued)

OTHER PUBLICATIONS

Johnson et al., History data facility in the SLC control system, May 6-9, 1991, IEEE, vol. 3, 1540-1542.*

(Continued)

Primary Examiner—Jean B Fleurantin
(74) Attorney, Agent, or Firm—Buchanan Ingersoll & Rooney, PC.

(57) ABSTRACT

A computer-implemented method of providing a track history of information previously requested from a database. The method includes: providing a track history of user-selectable records that have corresponding metadata items applicable to identify a data set from a data superset stored in the database; providing a bank of transformers with different user-selectable transformers; wherein a selected transformer takes a selected record and transforms the metadata items of the record to application specific metadata according to a syntax determined by the transformer; and activating an application, which accepts the determined syntax, comprising posting the application specific metadata.

21 Claims, 10 Drawing Sheets

U.S. PATENT DOCUMENTS

| | | | |
|---|---|---|---|
| 7,051,038 | B1 | 5/2006 | Yeh et al. |
| 7,103,591 | B2 | 9/2006 | Asobayire et al. |
| 7,170,519 | B2 | 1/2007 | Patel et al. |
| 7,171,335 | B2 | 1/2007 | Liu et al. |
| 7,209,876 | B2 | 4/2007 | Miller et al. |
| 7,293,031 | B1 | 11/2007 | Dusker et al. |
| 2001/0013004 | A1 | 8/2001 | Haris et al. |
| 2002/0038230 | A1 | 3/2002 | Chen |
| 2002/0059183 | A1 | 5/2002 | Chen |
| 2002/0059195 | A1 | 5/2002 | Cras et al. |
| 2002/0062290 | A1* | 5/2002 | Ricci ............... 705/59 |
| 2002/0070953 | A1 | 6/2002 | Barg et al. |
| 2002/0087516 | A1 | 7/2002 | Cras et al. |
| 2002/0091681 | A1 | 7/2002 | Cras et al. |
| 2002/0129004 | A1 | 9/2002 | Bassett et al. |
| 2002/0156714 | A1 | 10/2002 | Gatto |
| 2002/0184024 | A1 | 12/2002 | Rorex |
| 2003/0009295 | A1 | 1/2003 | Markowitz et al. |
| 2003/0050825 | A1 | 3/2003 | Gallivan et al. |
| 2003/0061096 | A1 | 3/2003 | Gallivan et al. |
| 2003/0061358 | A1 | 3/2003 | Piazza et al. |
| 2003/0071814 | A1 | 4/2003 | Jou et al. |
| 2003/0088564 | A1 | 5/2003 | Lohmann et al. |
| 2003/0101119 | A1 | 5/2003 | Parsons et al. |
| 2003/0120593 | A1 | 6/2003 | Bansal et al. |
| 2003/0126136 | A1* | 7/2003 | Omoigui ............... 707/10 |
| 2003/0158795 | A1 | 8/2003 | Markham et al. |
| 2003/0193502 | A1 | 10/2003 | Patel et al. |
| 2004/0039707 | A9 | 2/2004 | Ricci |
| 2004/0059705 | A1* | 3/2004 | Wittke et al. ............... 707/1 |
| 2004/0193576 | A1 | 9/2004 | Petculescu et al. |
| 2004/0230585 | A1 | 11/2004 | Middelfart |
| 2005/0076045 | A1 | 4/2005 | Stenslet et al. |
| 2005/0192931 | A1 | 9/2005 | Rogers |
| 2005/0198042 | A1 | 9/2005 | Davis |
| 2005/0210389 | A1 | 9/2005 | Middelfart |
| 2005/0223093 | A1* | 10/2005 | Hanson et al. ............... 709/224 |
| 2006/0149407 | A1 | 7/2006 | Markham et al. |
| 2007/0174262 | A1 | 7/2007 | Middelfart |
| 2008/0016035 | A1 | 1/2008 | Middelfart |
| 2008/0301539 | A1 | 12/2008 | Middelfart et al. |
| 2009/0187845 | A1 | 7/2009 | Middelfart |

FOREIGN PATENT DOCUMENTS

| | | |
|---|---|---|
| EP | 1 081 610 A2 | 3/2001 |
| EP | 1 081 611 A2 | 3/2001 |
| EP | 1 477 909 A1 | 11/2004 |
| EP | 1 574 969 A1 | 9/2005 |
| EP | 1 577 808 A1 | 9/2005 |
| EP | 1 659 503 A1 | 5/2006 |
| WO | WO 82/00726 | 3/1982 |
| WO | WO 97/08604 A2 | 3/1997 |
| WO | WO 01/09780 A1 | 2/2001 |
| WO | 01/35256 | 5/2001 |
| WO | WO 01/82135 A1 | 11/2001 |
| WO | WO 2004/102416 A2 | 11/2004 |

OTHER PUBLICATIONS

Priebe, et al., Ontology-based integration of OLAP and information retrieval, Sep. 1-5, 2003, IEEE, 610-614.*
Notice of Allowance dated Aug. 12, 2009 from related U.S. Appl. No. 10/556,214.
Notice of Allowance dated Sep. 8, 2009 from related U.S. Appl. No. 10/802,509.
Abualsamid, Ahmad. "PHP & Hosted Applications: A flexible scripting language for building dynamic web pages", *Dr. Dobb's Journal* (2001), 26(1): 56, 58, 60-63.
Spiers, Andrew, "Creating Dynamic WBMP images using Ph?", WMLScript.com, (Jan. 13, 2001) pp. 1-3.
Royappa, Andrew V. "The PHP Web Application Server" *Journal of Computing in Small Colleges* (2000), 15(3): 201-211.
"L" interface avec une base de données, Université Paris, (Oct. 18, 2000), pp. 1-4, Retrieved from http://web.archive.org/web/20001018225046.
*Internet Archive Wavback Machine* Search Results for "http://margotte.univ. Paris_1.fr/webcurse/html sql.html", Oct. 18, 2000. Retrieved from http://web.archive.org/web. All pages.
"Les bases de données relationnelles, Chapitre 25: les échanges de donn ées," (Jan. 3, 2003), pp. 1-6. Retrieved from http://cerig.efpg.inpg.fr/tutoriel/bases-de-donness/chap25.htm.
"Importer Et Exporter Avec Excel, Source No. 3673," *Visual Basic Code Sources*, (Jun. 19, 2002) pp. 1-2. Retrieved from http://www.vbfrance.com/code.aspx?ID = 3673.
Perez, J. M. et al. "A Relevance-Extended Multi-Dimensional Model for a Data Warehouse Contextualized with Documents" DOLAP (2005) p. 19-28.
Form PCT/ISA/210 (International Search Report) dated Dec. 5, 2007, issued in corresponding International Application PCT/DK2007/000232. All Pages.
Form PCT/ISA/237 (Written Opinion of the International Searching Authority) dated Dec. 5, 2007 issued in corresponding International Application PCT/DK2007/000232. All Pages.
B. Azvine et al., "Intelligent Process Analytics for CRM", BT Technology Journal, Jan. 2006, vol. 24, No. 1, pp. 60-69, XP-019392378, Kluwer Academic Publishers.
Pawan Chowdhary et al., "Enterprise Integration and Monitoring Solution Using Active Shared Space", Proceedings of the 2005 IEEE International Conference on e-Business Engineering (ICEBE'05), Oct. 12, 2005, pp. 665-672, XP-010860530, The Compute Society.
Russell Barr et al., "Real Time Modeling for Financial and Performance Management", Cement Industry Technical Conference, IEEE, May 15-20, 2005, pp. 43-51, XP-010840065.
Form PCT/ISA/210 (International Search Report) dated Nov. 11, 2004, issued in corresponding International Application PCTDK2004000347. All Pages.
Michelle X. Zhou & Sheng Ma, "Representing and Retrieving Visual Presentations for Example-Based Graphics Generation," Proceedings, 1st International Symposium on Smart Graphics, Hawthorne, NY, USA (Mar. 21-23, 2001), pp. 87-94.
Aloia, N., "Design of Multimedia Semantic Presentation Templates: Options, Problems and Criteria of Use." Proceedings of the Working Conference on Advanced Visual Interfaces, ACM Press (1998) pp. 205-215.
Mackinlay, J., "Automating the Design of Graphical Presentations of Relational Information" ACM Transactions on Graphics (vol. 5) (No. 2) (1986) pp. 110-141.
Office Action dated Mar. 20, 2007 from related U.S. Appl. No. 10/302,509.
Office Action dated Jul. 18, 2006 from related U.S. Appl. No. 10/802,509.
Office Action dated Dec. 11, 2007 from related U.S. Appl. No. 10/802,509.
Office Action dated Dec. 15, 2008 from related U.S. Appl. No. 10/802,509.
Office Action dated Jun. 15, 2009 from related U.S. Appl. No. 11/509832.
Office Action dated Sep. 19, 2008 from related U.S. Appl. No. 11/509,832.
Office Action dated Mar. 20, 2007 from related U.S. Appl. No. 10/449,811.
Office Action dated May 4, 2009 from related U.S. Appl. No. 10/449,811.
Office Action dated Jul. 18, 2006 from related U.S. Appl. No. 10/449,811.
Office Action dated Sep. 15, 2008 from related U.S. Appl. No. 10/449,811.
Office Action dated Nov. 10, 2005 from related U.S. Appl. No. 10/449,811.
Office Action mailed Dec. 18, 2007 from related U.S. Appl. No. 10/449,811.
Office Action mailed Sep. 23, 2008 from related U.S. Appl. No. 10/556,214.

Office Action dated Dec. 21, 2007 from related U.S. Appl. No. 10/556,214.

EP Search Report dated Dec. 18, 2008 from EP Application No. 07 38 8055 corresponding to U.S. Appl. No. 11/509,832.

Becks, A., "Sewasie - Specification of the Interface Design" XP002300607, Retrieved from the Internet: URL: http://www.sewasie.org/documents/D-4-4-interface-design.pdf> [retrieved on Oct. 13, 2004] :All Pages.

W. Cody et al., "The Integration of Business Intelligence and Knowledge Management" XP002300608, Retrieved from the Internet: URL: http://www.research.ibm.com/journal/sj/414/cody.pdf> [retrieved on Oct. 13, 2004]. All Pages.

Becks, A., "Sewasie - Specification of the Architecture of the Monitoring Agent/Visualization Component" XP002300606, Retrieved from the Internet: URL: http://www.sewasie.org/documents/D-4-1-monitoring-agentarchitecture.pdf> [retrieved on Oct. 13, 2004]. All Pages.

Communication from European Patent Office dated Jul. 28, 2004 from related EP Application No. 04388019.

Office Action dated Dec. 8, 2009 from related U.S. Appl. No. 11/509,832.

Communication dated Mar. 6, 2009 from related EP Application No. 04 388 077.2 corresponding to U.S. Appl. No. 10/991,302.

Communication dated Sep. 2, 2008 from EP Application No. 08 15 5432 corresponding to U.S. Appl. No. 12/112,178.

"MicroStrategy Introduces Next-Generation Dynamic Enterprise Dashboards" Thomasnet Industrial Newsroom, [Online] Jan. 22, 2007, XP002491679 Retrieved from the Internet: URL:http://news.thomasnet.com/fullstory/802157> [retrieved on Feb. 25, 2010].

Technologies4targeting Ltd.: "Cognos Visualizer - Corporate dashboards that give managers insight to make better decisions" Internet Article, [Online] 2004, XP002491680 Retrieved from the Internet: URL:http://www.tech4t.co.uk/pp./cognos_visualizer.html> [retrieved on Feb. 25, 2010].

Chaudhuri S et al: "An Overview of Data Warehousing and OLAP Technology" SIGMOD Record, ACM, New York, NY, US, vol. 26, No. 1, Mar. 1, 1997, pp. 65-74, XP002193792 Issn: 0163-5808.

Microstrategy Incorporated: "MicroStrategy 8 Frequently Asked Questions (FAQ)" Internet Article, [Online] 2005, XP002491681 Retrieved from the Internet: URL:http://www.firstbi.com.tw/download/8.0%20FAQ.pdf> [retrieved on Feb. 25, 2010].

Communication dated Aug. 10, 2007 from EP Application No. 04 388 077.2 corresponding to U.S. Appl. No. 10/991,302.

Communication dated Oct. 29, 2009 from EP Application No. 04 388 077.2 corresponding to U.S. Appl. No. 10/991,302.

* cited by examiner

DATABASE TRACK HISTORY

BACKGROUND

Data processing techniques for analytical purposes are, contrary to data processing for transaction purposes, optimized with respect to providing a user with processors and presentation tools that can generate illustrations of the result of a specified analysis task.

Not only the data processing techniques, but also the data on which the analysis is to be based are often arranged with the special aim of supporting analysis purposes. This means that data are organised in a straight forward or flat organisation. This straight forward organisation of the data requires, however, a higher memory consumption and longer access time to the data when compared to organisation of data for transaction purposes. Typically, databases for analytical purposes comprise redundant data in that pre-computed aggregations of data are comprised in the database along with underlying data, ie data across which the aggregation(s) is/are performed. Thus, one can say that such a database represents data at different levels of granularity.

A well recognised organisation of data for analysis purposes comprises multidimensional databases e.g. so-called cube databases, or simply Cubes, for OLAP, OnLine Analytical Processing, databases. However, various types of databases and other types of data structures can be used for analytical processing, including relational databases, flat file databases, XML (Extensible Markup Language) databases, etc. In these databases elements of data can be denoted data items and can be defined as a field in a specific record, a cell in a table or spreadsheet, or a delimiter or tag separated or fixed-length data entity.

Despite their different structures each of the data items in the databases can be categorized as being so-called measures or dimensions. From a data representation point of view there are prima facia no differences, but from a user's point of view, a data item of the measures type can be interpreted as a measure value given a specific condition specified by an associated value of a data item of the dimensions type. A value of a data item of the dimensions type is also recognised as a so-called dimension value or a criterion.

Hence, for instance a range of data items categorized as measures can represent sales figures in an organisation. These sales figures are given a meaning when associated with the specific conditions of the time instances at which the sales figures represent the sales in the organisation. The time instances are represented by means of the dimension values. By categorizing the data items in this way an additional and more abstract way of representing data is provided; this additional representation is also denoted metadata. In the above example, time is thus a dimension and the sales figures are categorized as a measure.

The data processing techniques for analytical purposes operate on these data whatever the organisation of the data to provide a result of the analysis. For this purpose, an analysis task can be specified by a request to a database. The result of the analysis is then illustrated by means of a data report. The data report can be set up by a user who selects presentation objects and properties thereof by of a so-called 'report generator' or a 'chart wizard', wherefrom default layout properties or user-specified layout properties are selected before making the presentation. Especially, when the data report is presented on a graphical user interface it is also referred to as 'a view'.

In connection therewith it is a well-known situation that a user often uses some sort of trial-and-error for tuning, on the one hand, the specification of the analysis task and, on the other hand, the illustration of the result of the analysis. Therefore, a further specification of the analysis task and the illustration of the results are functions which more or less have merged into the same user interface for more or less simultaneous tuning of an analysis and the results thereof.

The graphical/visual presentation of data is greatly influenced by the type of graphical/visual objects applied to make the presentation and layout properties of the graphical/visual objects. In the process of performing an analysis a comparative study is often desired either to compare different scenarios or to compare different views of the same situation. Moreover, it is desired to collect results of individual steps of the analysis in order to provide documentation of the analysis and since such partial results are considered a portion of an analysis. Therefore, typically, several largely similar data reports (or views) are requested. During a process of performing an analysis, often, either the form of the dataset(s) is changed or the form of the presentation is changed. Thereby, either the data or the presentation is changed while maintaining the presentation or data, respectively. Thereby, the (difference) result of the comparative analysis is made clear.

It is observed that steps or partial results of the analysis process are valued as a documentation of the final result.

The ever increasing data capacity of storage memories and the widespread use of databases increase the amount of time a user is confronted with the task of, on the one hand, making queries to databases; and on the other hand, selecting a presentation for the data retrieved by the query.

The above collectively states that (human) resources are spent on building up information which stage-by-stage documents an analysis process. This build-up information is often bound to special syntaxes and to closed proprietary formats.

Prior Art

Within the field of so-called business intelligence applications cooperating with databases it is well known provide a graphical user interface wherefrom fields of tables in a database are selectable and criteria can be entered. From a set of selected fields and entered criteria a formal query to the database is automatically generated.

However, in connection with such a business intelligence application, it is a well-known situation that a user during an analysis process has to repeat the steps of selecting fields and enter criteria before a satisfactory analysis result is obtained. Since often a more compound result (or further results) is needed to enlighten a situation from different viewing angles, steps of further analysis processes are performed largely correspondingly to steps of previous analysis. Thereby, time is spent on redundant work.

Often a user uses some sort of trial-and-error for tuning, on the one hand, the specification of the analysis task and, on the other hand, the illustration of the result of the analysis. Every step of such an analysis process can provide emphasis on important aspects of the dataset. Thus, even intermediate results can provide important information.

SUMMARY OF THE INVENTION

The above and other shortcomings of the prior art are overcome by a computer-implemented method of providing a track history before a database, comprising the steps of: providing in a storage memory, a track history of choice selectable records that each comprises metadata items applicable to identify a data set from a data superset stored in the database; providing a bank of transformers with different choice selectable transformers; wherein a choice selected transformer takes a selected record and transforms the metadata items of the record to application specific metadata according to a syntax determined by the transformer; and providing activation of an application, which accepts the determined syntax, comprising making the application specific metadata available for the application.

The track history provides for recalling information which has previously been built up or developed for identifying a specific dataset. For the purpose or either continuing analysis or taking an action based on the analysis a user is provided with the option of transforming the recalled information, which has previously been built up. The information is transformed by a transformation providing information targeted for a specific application. The application is either configured to continue analysis or perform another action based on the built-up information. Subsequently, the application is activated. The step of making the application specific metadata available for the application can be performed by transmission or posting of the data or by augmenting a call of a function of the application by the data.

Thereby, information which has been built up in the track history is utilizable for providing activation of further analysis where presentation structure or data structure is maintained. Alternatively, information which has been built up in the track history is utilizable for providing activation of further analysis based on datasets outside the database, but based on metadata carried in the selected record. Further, alternatively activation of applications operating out from the database is performed based on the selected record; or activation of applications operating in to the database is performed.

The analysis task and the illustration of the results have merged into the same user interface for more or less simultaneous tuning of an analysis and illustration of the results thereof. Further, actions can be taken and initiated directly from the analysis. This greatly improves efficiency in performing analysis and in taking actions based on an analysis.

In a preferred embodiment, a first of the transformers is configured to provide the application specific metadata, using a first syntax which is determined by a transformation embedding the metadata items of the record in an information body text; and wherein a first application, which accepts the specified syntax, provides a presentation that combines the information body text and the application specific metadata. Thereby, metadata are merged with body text phrases to provide readable information to a user about the content of the presentation.

Preferably, the information body text is provided in a natural language e.g. in a textual form or as a machine-spoken message.

When the information text is supplemented by a user's description, it is possible to add remarks to the metadata identifying the data subset or to the data subset itself.

The records can further comprise presentation properties which define properties of a presentation of a data set by means of a graphical object specified by the properties. This makes it possible to carry the items identifying the data subset and the presentation properties together as a compact single data unit or object. In case the data subset is not carried with the record a very compact representation is obtained. However, the record may carry the data subset in the record for less constrained portability and for recreating the presentation at a later point in time without being connected to the database.

The Old View

When the records further comprise presentation properties which define properties of a presentation of a data set by means of a graphical object specified by the properties, and the method comprises the step of: providing a presentation of the data set by means of the specified object in accordance with the presentation properties, it is possible to re-establish the former view, but with more recent data.

Preferably, the records further comprises presentation properties which define properties of a presentation; and the method comprises the step of: merging metadata and presentation properties from a record representing a current view and a choice selected record representing a former view. Thereby, two different views can be compared since at least a portion of the properties, be it metadata or presentation properties, are maintained from the current view or a former view, when providing a new view based on merging the metadata and presentation properties.

In a preferred embodiment a second of the transformers is configured to provide the application specific metadata from the metadata items and the presentation properties of a selected record; and a second application provides a presentation of the data set, identified by the metadata items of the selected record, by means of a graphical object in accordance with the presentation properties of the record.

Preferably, the method comprises the steps of: retrieving metadata items of a choice selected record; retrieving presentation properties of a record that represents a current view; and providing a presentation of the data set identified by the retrieved metadata items according to presentation properties retrieved from the record that represents the current view. Thereby a data subset, identified by a record in the track history, can be presented by the configuration (as determined by the presentation properties) of a current view. This makes it possible to enhance different aspects of a data subset.

Expediently, the metadata items of a choice selected record are items of a type setting criteria in identifying the data subset; and the presentation properties identify a graphical object for providing the presentation of the data set. In addition to identifying a dataset by means of measures and dimensions, a dataset can be further identified by means of criteria. Thereby, dimensions and measures can be selected freely, but under constraints set by the graphical object.

The method may comprise the step of: retrieving metadata items of a dimensions type and a measures type from a record representing a current view; and the data set identified by the metadata items of the choice selected record is further identified by the metadata items of the dimensions type and the measures type from the record representing a current view. Thereby, the data subset identified by means of criteria is mapped on to the measures and dimension of the current view. Thereby, a user can map various former data sets on to a set of dimensions which the user is particularly familiar with.

Expediently, a record comprises criteria; and a current presentation comprises a view structure of multiple graphical objects each providing a presentation of a data subset which is partially identified by an individual criterion; and the method comprises the steps of: applying criteria of the record to each of the data subsets to change the identification of the data subsets; and updating the current presentation to provide a presentation of the data subsets as identified by the changed identification. Consequently, all criteria of the former record are applied to all objects of a current view. That is, the criteria are applied as a so-called background or collected criteria for the entire view. From a practical point of view, criteria of the record are collected to be applied commonly. It can be determined to apply the criteria as a background criteria or collected criteria when the dimension on which a criterion is defined is not present in a presentation. Please note, that a criterion is also denoted a dimension value (comprising a range of values).

Expediently, a choice selected record comprises subsets of metadata items with respective criteria; and a current presentation comprises a view structure of multiple graphical objects each providing a presentation of a data subset which is partially identified by an individual criterion; and the method comprises the steps of: changing individual ones of the identifications of the data subsets of the presentation by application of a respective subset of metadata items of the criteria type in the choice selected record; and updating the presentation of the current presentation to provide a presentation of the data subsets as identified by the changed identifications. Thereby criteria of individual graphical objects in a former view are applied to individual graphical objects of a current view. Preferably, when an individual criterion is a dimension value of a dimension which is presented in an individual graphical object, the criterion is applied along the dimension in the presentation. When a criterion is applied in this way it is also denoted a distributed criterion.

In a preferred embodiment, a third of the transformers is configured to provide the application specific metadata from a choice selected record and a representation of current presentation properties which are provided by a current presentation; and a third application provides a presentation of the data set identified by the choice selected record in accordance with the representation of current presentation properties. Thereby the presentation can be provided by an application which requires the information of the former track record and the current presentation properties according to a specified syntax.

Preferably, a fourth of the transformers is configured to provide the application specific metadata, and a fourth application provides changed values of the data set according to a specification of the changes provided in the application specific metadata. Thereby e.g. the prices in a pricelist can be changed which in turn may change values of measures like 'revenue' and 'turnover'. The changed values can be provided to a transactional database which in turn provides changed values to an analytical database. That is, the changed values are not necessarily provided directly to the database with which the track history operates.

A fifth of the transformers can be configured to provide the application specific metadata, and a fifth application provides search results in response to search criteria provided in the application specific metadata. Ordinary copy and paste would not be expedient for carrying a search statement to the fifth application since syntax and format can differ and consequently would provide confusing results, if any at all.

Expediently, a current presentation comprises a view structure of multiple graphical objects each providing a presentation of a sub-ordinary data subset wherein a graphical object comprises multiple graphical elements, which are associated with metadata items that define criteria for those data, of the data subset, represented by means of the elements; and where the method comprises the steps of: in response to a user's directed action to a graphical element of a graphical object, determining those metadata that apply to the graphical element, and retrieving further data defined by the determined metadata; and making a presentation of the further data by means of a graphical object of the view structure. Thereby graphical control of criteria for identifying a data set is obtained.

In response to a user's directed action to the graphical element of the graphical object, the graphical element can be enhanced visually relative to other elements of the graphical object to reflect that the element represents a criterion for the data presented by means of the further graphical object.

Thereby the graphical control is provided with a graphical response indicating the form of the criteria.

BRIEF DESCRIPTION OF THE DRAWING

The invention will be described in more detail in connection with the drawing, in which.

DETAILED DESCRIPTION OF A PREFERRED EMBODIMENT

Generally, it should be noted that a dimension is a collection of data of the same type; it allows one to structure a multidimensional database. Values of a dimension are denoted positions or dimension values or criteria. A multidimensional database is typically defined as a database with at least three independent dimensions. Measures are data structured by dimensions. In a measure, each cell of data is associated with one single position in a dimension.

The term OLAP designates a category of applications and technologies that allow the collection, storage, manipulation and reproduction of multidimensional data, primarily for analysis purposes.

Special modules may be provided to transform operational data from a source database or transactional database to analytical data in a data warehouse. In some situations it may be inconvenient to transform the operational data to analytical data which are stored in another database. Therefore the operational database, which is typically a relational database, can be emulated such that it exposes an interface from which the operational database is accessible as a multidimensional (analytical) database.

In the below, the term database can designate any type of database whether analytical or transactional, but it should be clear that analytical databases are preferred in connection with the present invention.

Figure 1:
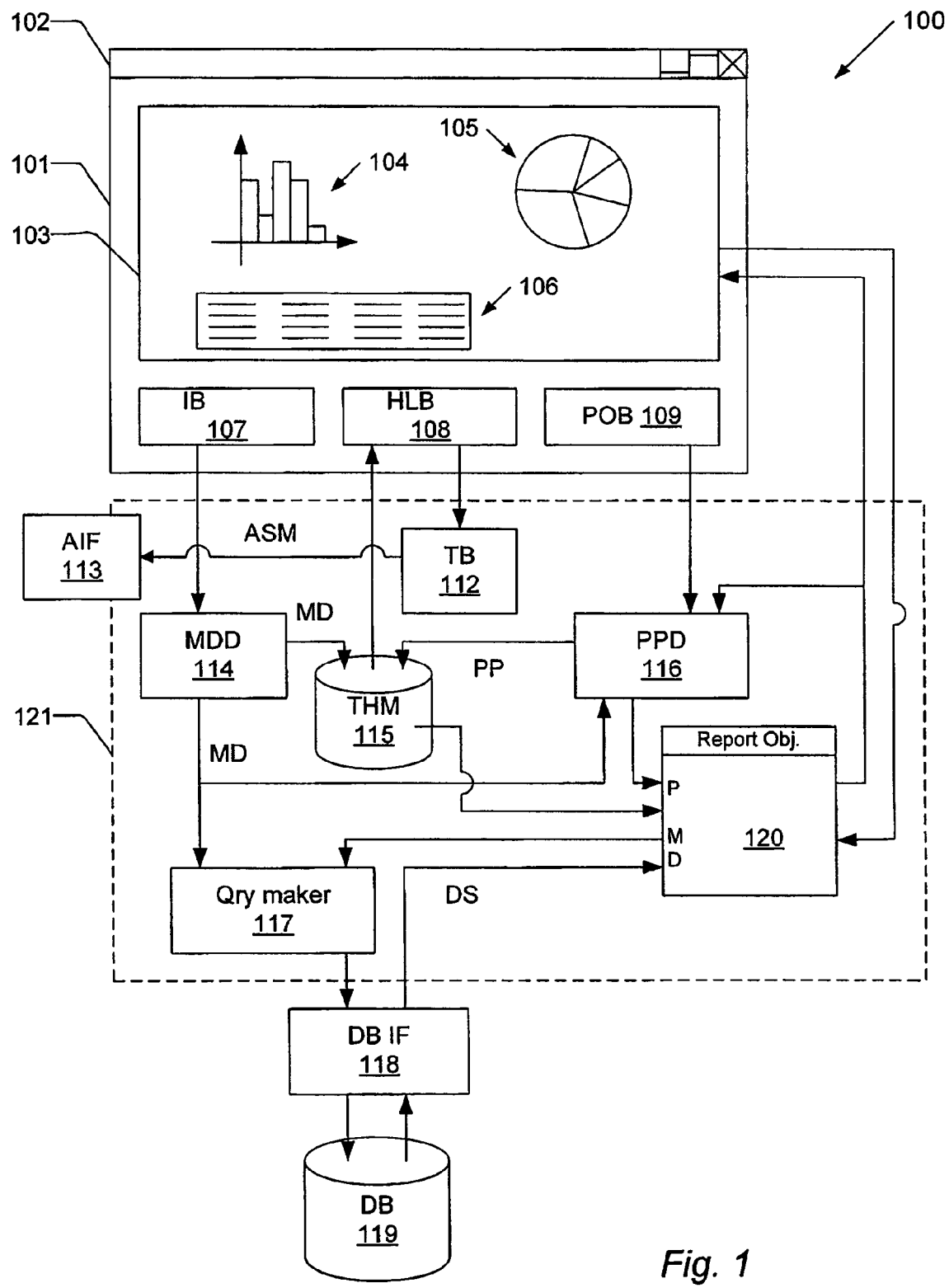
FIG. 1 shows a block diagram of a system with a user interface and a component providing a track history.

FIG. 1 shows a block diagram of a system with a user interface and a component providing a track history. The system 100 comprises a user interface 101 which operates in combination with a middleware component 121 and a database DB, 119 with a database interface DB IF, 118.

The middleware component 121 provides functionality of the user interface 101 and is configured to receive inputs from the user interface and provide outputs to the user interface 101. The middleware component 121 provides contents to the user interface 101 by means of among other means the database 119. The database 119 is accessed via the database interface 118.

The middleware component is also configured to submit a query to the database 119 via the database interface 118 and to retrieve a result dataset from the database 119 via the database interface. Preferably, the database interface comprises a cache memory for fast retrieval of a previously retrieved dataset.

The user interface 101 is shown in the form of a window which has a control bar 102 with controls for closing, maximizing and minimizing the window on a display. The window comprises control components in the form of an input text box 107, a track history list box 108, a presentation options box 109, and a data report 103 in which different graphical presentation objects 104, 105, 106 are arranged. The data report can thus be arranged as a container of the presentation objects. This data report or container is also designated a view or view structure. Different graphical presentation objects are arranged in the view, e.g. as shown a bar chart object 104, a pie chart object 105, and a table object 106. These graphical presentation objects each provides a presentation of a dataset retrieved from the database 119.

The user interface 101 and the middleware component 121 provide in combination the following functionality:

In a first situation, a user can submit a request for a data set to be presented by means of the view or data report 103. The request can be submitted in the form of a natural language or pseudo-natural language comprising words or text items which identify metadata items in the database 119. The request is processed by a metadata determining unit 114 of the middleware component 121. The metadata determining unit 114 provides an output with metadata items for identifying a dataset in the database 119. The metadata items are stored in a record in a track history memory THM, 115. Further, the metadata items are forwarded to a query maker 117 which provides a formal query according to a syntax accepted by the database interface 118. The database interface 118 retrieves the dataset identified by the metadata items, and thus the formal query, from the database 119.

The retrieved data set is provided to a report object 120 which collects the metadata items, for identifying the data set, and presentation properties for rendering a presentation of the dataset in the view 103. Additionally, the report object provides methods for interacting with the view or the graphical presentation objects thereof.

The presentation properties are provided by a presentation properties determining (PPD) unit 116 which has a first mode where presentation properties are determined automatically from the metadata items, MD, provided by the metadata determining unit 114. In a second mode the PPD unit 116 receives a user's input to modification of the presentation properties via the presentation options box 109. Thereby, the presentation can be adapted to a user's preferences. In a third mode, a combination of functionality of the first and second modes is provided.

The presentation properties provided by the PPD unit 116 is optionally stored in the record containing the metadata items of the presentation.

In a second situation, a user can retrieve a former request for data, in the form of metadata items, stored in a record. The user can make a choice to select the record from the track history memory 115 by means of the history list box 108 on the user interface 101. Further, the user is provided with an option of selecting a transformer of a transformer bank TB, 112. The transformer takes the metadata items, representing the former request for data, and provides the metadata as application specific metadata, ASM, to an application interface AIF, 113. The application interface 113 is configured to launch an application or a function of an application augmented by the application specific metadata. This will be described in greater detail in connection with the following figures.

In a third situation, a user can request further data by an action directed directly to an element of a graphical presentation object of the view. In response to detecting the action, datasets of the individual presentations of the view are changed to provide for exploring or analyzing the datasets further. This will also be described in greater detail in connection with the following figures.

Reverting to the first situation, a user can request data by means of the input text box 107 wherein the user can write a question in a natural language in a preferred language e.g. the English language. From a user's perspective this question constitutes a query to the database 113. In an exemplary embodiment the database 113 can contain the following data items, wherein the data items are categorized as measures or dimensions and wherein a dimension exists at different levels such as day, month, and year:

| Measures: | Dimensions: |
|---|---|
| 'turnover' | 'time' (level 0: Year; level 1: Month; level 2: Day) |
| 'cost' | 'Customer' (level 0: Group; level 1: Name) |
| 'sales' | 'Product' (level 0: group; level 1: Name) |
| 'revenue' | 'Country' |
| 'budget' | 'BusinessUnit' |

Thereby e.g. the following questions can be asked:
1) I would like to see 'cost' grouped by 'time, month'
2) I would like to see 'turnover' grouped by 'time, month', 'customer, group' and 'product, name'
3) I would like to see 'turnover' for year 2004
4) I would like to see 'country'

A question like the above ones are forwarded to a metadata determination unit 114 which is arranged to identify metadata items and their category and levels by parsing the question.

Based on the identified metadata items, the metadata determination unit 114 is able to look up a track history memory 115 of previously used combinations of metadata and presentation properties. The contents of the storage memory 115 can have the following form as shown in table 1:

TABLE 1

| Data | Presentation | Frequency |
|---|---|---|
| Time, Level 1 Turnover | type = Barchart; legend = off; labels = off; 3D-effects = Orthogonal | 3 |
| Country; Contribution Margin | type = map; legend = off; labels = on; 3D-effects = None | 3 |
| Customer, Level 0; Turnover; Cost; Contribution Margin | Type = Crosstab; legend = off; labels = off; 3D-effects = None | 2 |
| ... | ... | ... |

By searching the storage memory 110, with contents as shown in table 1 above, for a match on the data items and levels identified from the question, it is possible to determine whether a previous presentation matching the question has been used. Thereby preferred presentation properties can be found. If for instance it is determined that a question involves the data item 'time, level 1' and 'turnover', it can be deduced that the preferred presentation of these data items is a bar chart with properties as shown in table 1 above.

Presentation properties are determined by the presentation determining unit 116 based on the result of the search for matching data items and levels. The determined presentation properties are stored in a presentation memory object 120.

The metadata determining unit 114 converts the question or the metadata, as the case may be, to a query that can be submitted to a database 119 via a database connection. In response to the query, the database provides a result dataset. This result dataset is sent to a presentation memory object 120. Thereby the result data set and the presentation properties are handled in the same memory object 120.

Via the presentation determining unit 116, the presentation properties from the data object or from the presentation options box 109 can be used for updating the frequency count and/or another update of the storage with the registered combinations of data and presentation properties in storage memory 115. The frequency count and/or another update of the storage can be updated in response to a user changing focus from the data report 103 to the input box 107 and/or closing or minimizing the window 102. Alternatively, a button or other control (not shown) on the user interface 101 can be used as an acceptance of storing the presentation properties of the present presentation and/or update the frequency count. In the latter case, a more transparent update is provided.

In the third situation, wherein a user can request further data by an action directed directly to a figure or element of the view, a data item is bound to the element and contains metadata associated with the element. The metadata is preferably a criterion in the form of a value or range of values of a dimension i.e. a so-called dimension value. Thus, when an element is selected, metadata associated with the element is retrieved or deduced. In that situation, the report object 120 is configured to identify such metadata Items and provide modified datasets as determined by the metadata associated with the element in response to the action.

Figure 2:
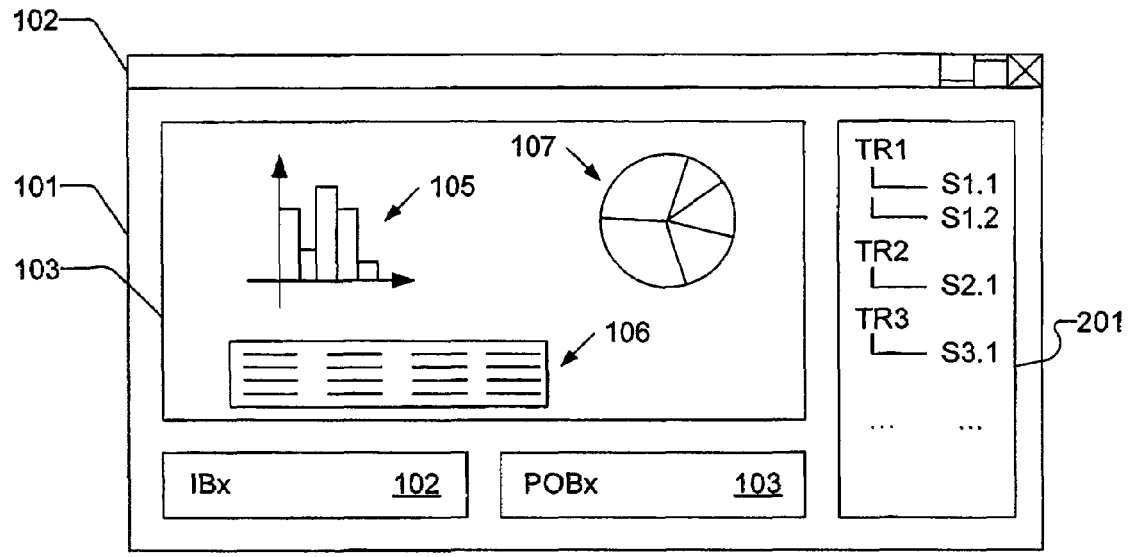
FIG. 2 shows a user interface structure with a track history tree-view component.

FIG. 2 shows a user interface structure with a track history tree-view component. The user interface structure 101 comprises a track history list box, HLB 201, corresponding to the one shown in FIG. 1, but shown in greater detail. The HLB is shown in the form of a so-called tree-view component whereby parent nodes of the tree-view (TR1, TR2, TR3) provide a reference to a record of the track history memory. The record comprises information describing a view with presentation objects which has been provided at an earlier point in time. The parent nodes (TR1, TR2, TR3) of the tree-view have child nodes S1.1, S1.2; S2.1; S3.1. The child nodes provide references to individual metadata items of the record referred to by the parent node.

In a first mode, the tree-view is structured such that a parent node represents a view of multiple graphical objects; whereas a child node represents a changed instance of the parent node.

In a second mode, the tree-view is structured such that a parent node represents a view of multiple graphical objects; but whereas a child node represents an individual graphical presentation object of the view structure. Thereby, the child node refers to metadata items and presentation properties of the individual presentation object.

Parent nodes and child nodes are provided with event-activated menus from which an application associated with a transformer, or vice versa, is choice selectable.

Figure 3:
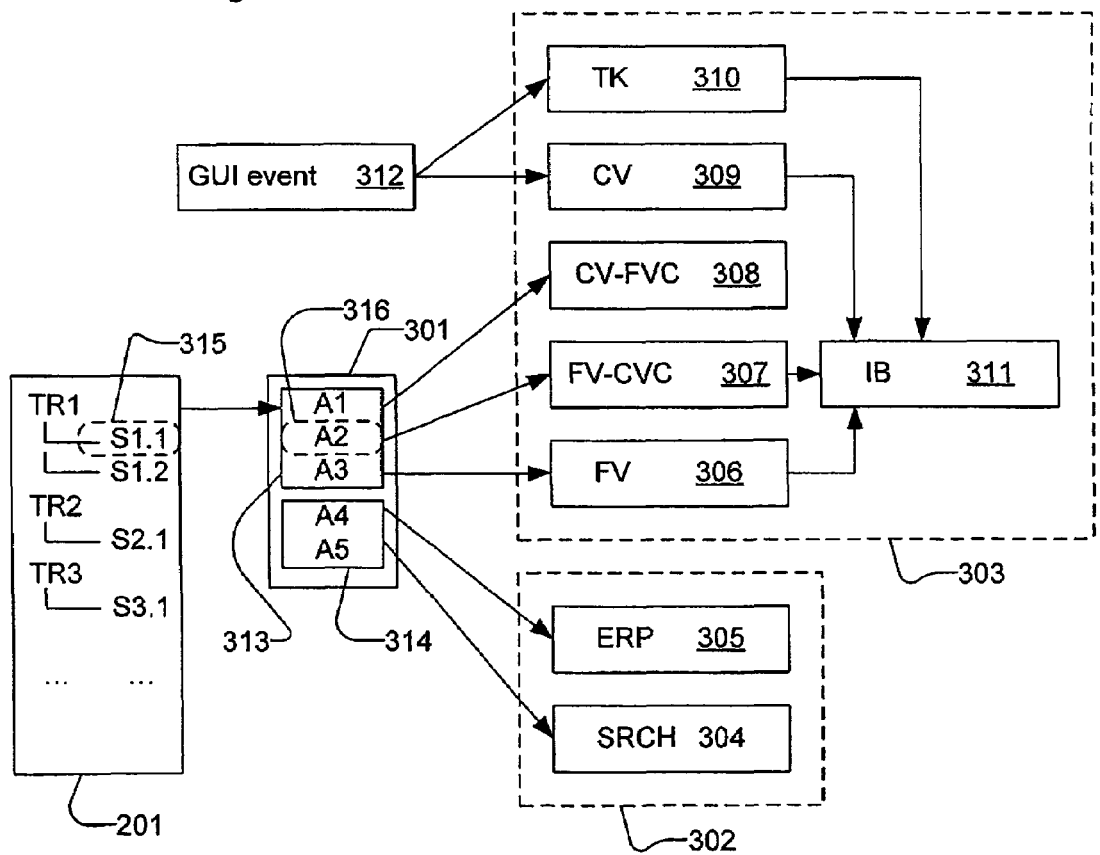
FIG. 3 shows a track history tree-view component with a selector menu and a block diagram of applications.

FIG. 3 shows a track history tree-view component with a selector menu and a block diagram of applications. The track history tree-view component 201 provides a selector menu 301 on which named applications are listed. The selector menu 301 displays multiple menu items designated A1, A2, A3, A4 and A5 and is configured to provide a user with the option of selecting a menu item. Preferably, the menu items designate named applications, but it could as well designate named transformations.

The selector menu 301 is displayed when a node of the tree-view has been selected. Thereby a view and the record describing the view is identified when the selector menu 301 is being displayed.

In response to a selector menu item (A1, A2, ..., A5) being selected, a transformation of the identified record is performed to provide application specific metadata and activation of an application associated with the transformation is requested.

In a preferred embodiment, the applications are divided into a group 302 of external applications and a group of internal applications. The group of internal applications comprises applications which form integrated parts of the application providing the middleware component 121 and the user interface 101. The group of external applications comprises applications which do not form integrated parts of the application providing the middleware component 121 and the user interface 101. These applications are designated external applications. Applications of both groups can be activated from the selector menu 314.

The group 302 of external applications comprises an application SRCH, 304 which is an Internet search engine, accessible via an internet protocol e.g. the Internet Protocol, IP, or hyper text transfer protocol, HTTP, the proprietary protocol SOAP, or other network protocols. Further, the group comprises an Enterprise Resource Planning, ERP, application 305. This application is of a type that provides changed values of a dataset in the database according to a specification of the changes provided in the application specific metadata. The specification comprises an identification of the dataset to be changed and an identification of which changes to provide. Thereby e.g. prices in a pricelist can be changed e.g. by +10% which in turn may change values of measures like 'revenue' and 'turnover'.

A further application (not shown) of the group is a so-called Customer Relations Management, CRM, application. This application is of a type that provides distribution or collection of datasets according to a specification provided in the application specific metadata. Other applications which can be activated comprise Supply Chain Management applications or other so-called operational applications.

An activation of an external application associated with the transformation is requested. The request is in the form of a call of a function, which is exposed by means of an application interface e.g. a so-called Application Programme Interface, API. The function is preferably augmented by the application specific metadata. Alternatively, the request submitted by posting the application specific metadata following a http request.

The group 303 of internal applications comprises an application FV, 306 which loads a selected record, which represents a formerly provided view, FV, and re-establishes the view on the user interface 101.

Further, the group 303 comprises an application FV-CVC, 307 which loads a selected record and applies criteria of a current view, CVC, to provide a view with presentation objects and dimensions and measures of the former view, but with criteria of the current view.

Still further, the group 303 comprises an application CV-FVC, 308 which loads a selected record and applies criteria, FVC, thereof, to provide a view with presentation objects and dimensions and measures of the current view, but with criteria of the former view.

Further, the group 303 comprises an application TK, 309 which tracks a user's focus on the user interface by responding to events raised by a GUI event-responder 312 of the user interface 101. An event raised by the event-responder may be that a so-called 'mouse-over' event of the item S1.1 is detected. In response to the event, metadata bound to a respective element are loaded. The metadata are provided to an application IB, 311 which provides a user with element-specific information.

The group 303 of internal applications further comprises the application IB, 311 which provides the metadata items of the selected record in an information body text. The information body text is provided in connection with the view and especially configured for the Individual graphical objects. In connection with the application TK, 309 the metadata are provided by data items bound to specific elements of the graphical presentation objects. The application IB, 309 is configured to provide an information box on the user interface 101 in response to a signal from either one of the applications.

Moreover, the group comprises an application CV, 309 which provides changes to the current view in response to a user's directed action to specific elements of the presentation objects. Alternatively, the input text box provides for specifying changes to the current view.

The selector menu is shown in form dividing the applications in two groups 313 and 314. It is shown that the child node 315 is selected on the tree-view component 201 and that the application 312 is selected. The tree-view component 201 is also denoted 'an activity list' or 'drill history'.

Figure 4:
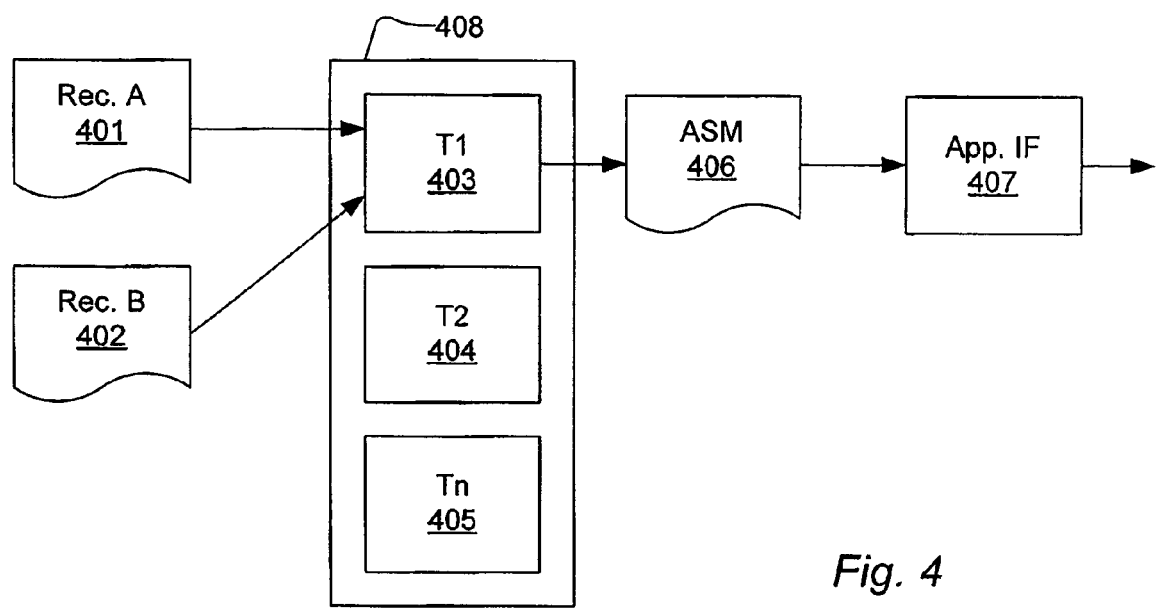
FIG. 4 shows a block diagram for activating an application which receives application specific metadata from the track record via a transformer.

FIG. 4 shows a block diagram for activating an application which receives application specific metadata from the track record via a transformer. A transformer bank 408 comprises a first transformer T1, 403 and a second transformer T2, 404. Further transformers are comprised by the transformer bank 407 e.g. as illustrated by a n'th transformer Tn, 405. Each of the transformers T1, T2 and Tn is configured to be activated e.g. in response to an item selected on the selector menu. When activated, a transformer takes a choice selected record 401 as input and transforms the metadata of the record to application specific metadata, ASM. The transformer is configured to provide contents of the application specific metadata from the metadata items of the record 401 and/or predefined items of information and/or presentation properties of the record 401. Alternatively, the transformer is configured to provide contents of the application specific metadata from a further record B, 402 in addition to the record A, 401. The further record B, 402 expediently represents a current view.

The transformer provides the ASM by a transformation of merging of the items and/or properties and/or a transformation of filtering the items and/or properties. The transformations can comprise operations related to the metadata items or formatting or syntax of the record and items thereof.

An application is activated via an application interface AIF, 407. In one embodiment the application is activated by calling a specified function of the application augmented by the application specific data ASM. In another embodiment a transformer posts the selected record following an event raised by the record being choice selected and a transformer having completed provision of the ASM.

The record is preferably provided in extensible Mark-up Language, XML, format. The below XML structure provides a fraction of a record with a parent node designated by the tags <record>, an upper intermediate node <view> and a lower intermediate node <presentation> and a first child node <metadata> and a second child node <presentation_properties>. The lower intermediate node <action_sequence> comprises a sequence of statements enclosed by tags designated <action>. Each action is generated by a user that performs analytical steps by specifying metadata and especially by specifying criteria. Below it is shown that a first action in a sequence is specified by the criterion of the dimension 'ProductGroup' being equal to "T-shirts".

```
<record>
    <name>TR1</name>
    <view>
        <presentation>
            <name>S1.1</name>
            <metadata>
            </metadata>
            <presentation_properties>
            </presentation_properties>
        </presentation>
        ...
        <action_sequence name=?>
            <action>ProductGroup="T-shirts"</action>
            <action>Region="DK"</action>
            <action>Time=2001</action>
            ...
        </action_sequence>
    </view>
</record>
```

The upper intermediate node <view> can comprise multiple lower intermediate nodes <presentation> and reflects that a view can comprise multiple graphical presentation objects. Each presentation comprise a metadata child node <metadata>. Optionally, a presentation node comprises a presentation properties child node <presentation_properties>.

A transformation of the above record (with any further information) for an Internet search application provides the resulting ASM in the form of three text items (words or numbers): JEANS DENMARK 2001. Thus, the transformation filters out the entire XML record, but the metadata items as such. Additionally, the text item 'DK' is converted to the text item 'DENMARK'. It is well-known to a person skilled in the art to provide such transformations e.g. by means of XSLT, extensible Stylesheet Language: Transformations.

Figure 5:
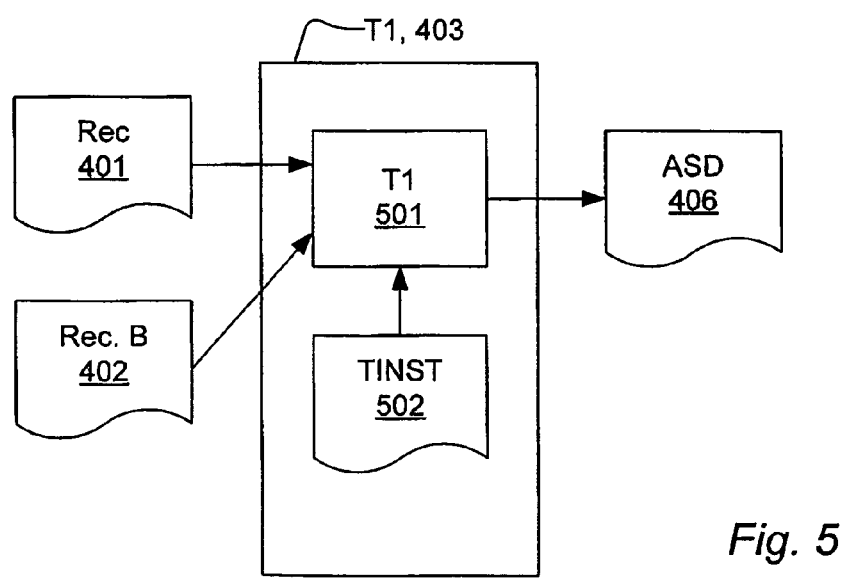
FIG. 5 shows a structure of a transformer.

FIG. 5 shows a structure of a transformer. The transformer T1, 403 is provided by a generic transformer engine 501 which provides a specific transformer by means of transformer instructions 502. The transformer instructions TINST, 502 is provided in a declarative programming language.

When the record is provided in extensible Mark-up Language, XML, format the declarative language is preferably the extensible Stylesheet Language: Transformations, XSLT.

In connection with FIGS. 3 and 5, the below table indicates which metadata items to process in the transformation to provide the application specific metadata, ASM.

TABLE 1

|  | CV-FVC | FV | FV-CVC | CV |
|---|---|---|---|---|
| Former rec. (index f) |  | Mf, Df, Cf, PPf | | |
| Current view (index c) |  | Mc, Dc, Cc, PPc | | |
| ASM comprises: | Mc, Dc, Cf PPc | Mf, Df, Cf, PPf | Mf, Df, Cc, PPf | Mc, Dc, Cc, PPc |

Table 1 shows, for four of the internal applications mentioned in connection with FIG. 3, which metadata items of a former record and a current view to provide in the ASM, output from a transformer. Metadata items of the measures type are represented by a capital 'M' and dimensions by capital 'D'. Presentation properties are represented by capital 'PP' and criteria are represented by capital 'C'. Index 'f' represents items of a former (selected) record and index 'c' represents items of the current view. From table 1 more detailed transformations can be provided.

Figure 6:
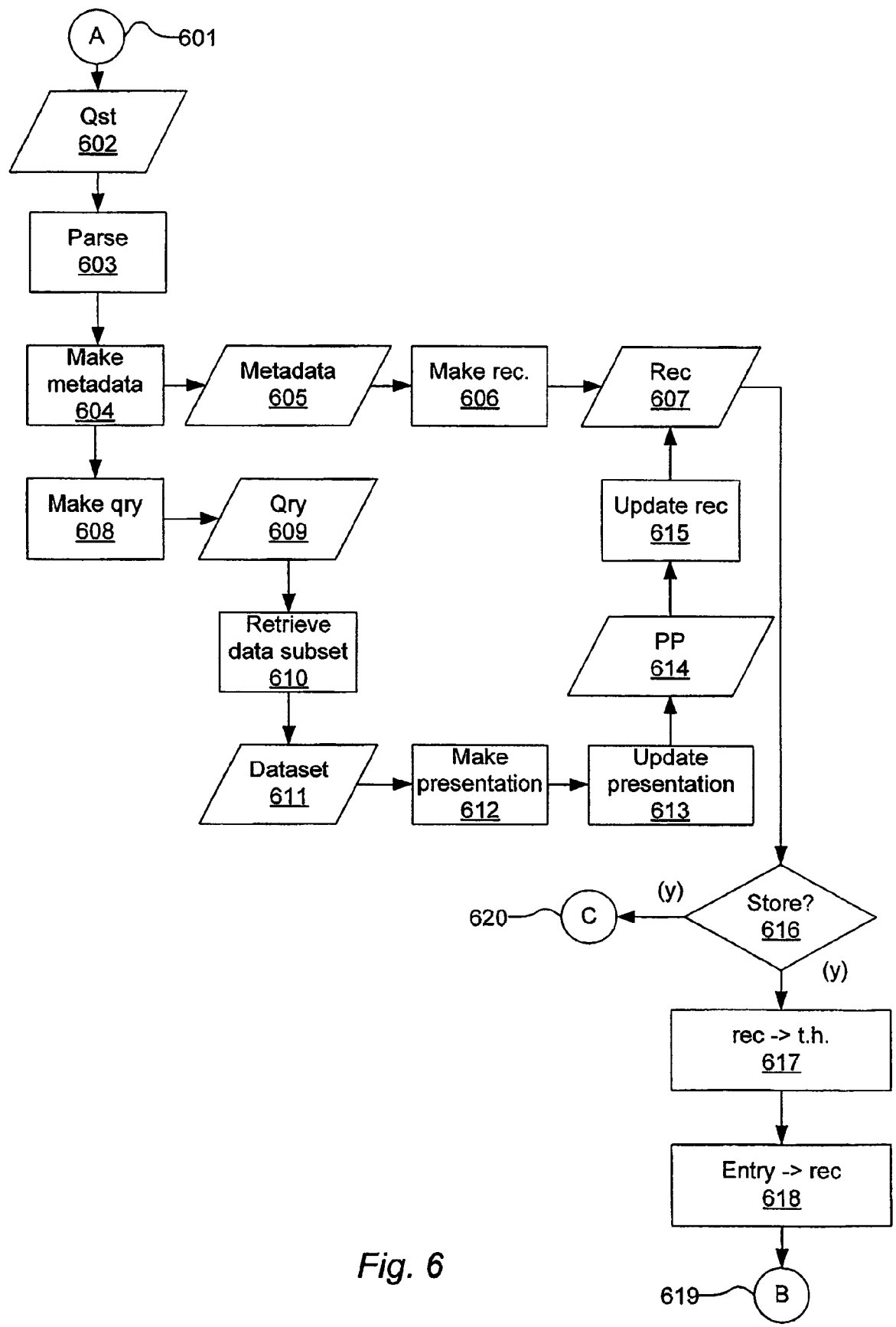
FIG. 6 shows a flow chart of creating a track record.

FIG. 6 shows a flow chart of creating a track record. The flowchart illustrates steps of the first situation described in connection with FIG. 1. At point A, 601 of the flowchart a question, QST, 602 is submitted for parsing in step 603. Parsing of the question reveals pieces of information from which metadata items 605 can be identified or provided in step 604. In step 606 the record 607 is created from the metadata items 605.

The step 604 of providing the metadata items 605 is followed by a step 608 of making a query 609 which is created according to a specified syntax e.g. SQL (Structured Query Language). In step 610 the query is submitted to a database for retrieving the dataset 611 specified in the query. A presentation of the dataset 611 is provided in step 612. Subsequently, in step 613, the presentation is open for updating and consequently modification of presentation properties 614. In step 615 the presentation properties 614 are added to the record 607.

In response to a user interaction or other event it is decided in step 616 whether to store the record 607. If it is decided not to store the record (n), the record is discarded. Alternatively, if it is decided to store the record (y) the record is added to the track history in step 617. In subsequent step 618 an entry is supplied to the user interface in order for a user to recall the record at a later point in time. This entry is preferably provided by the track history view.

The flowchart is terminated at point B, 619 where the record is stored or alternatively at point C, 620 where the record is discarded.

Figure 7:
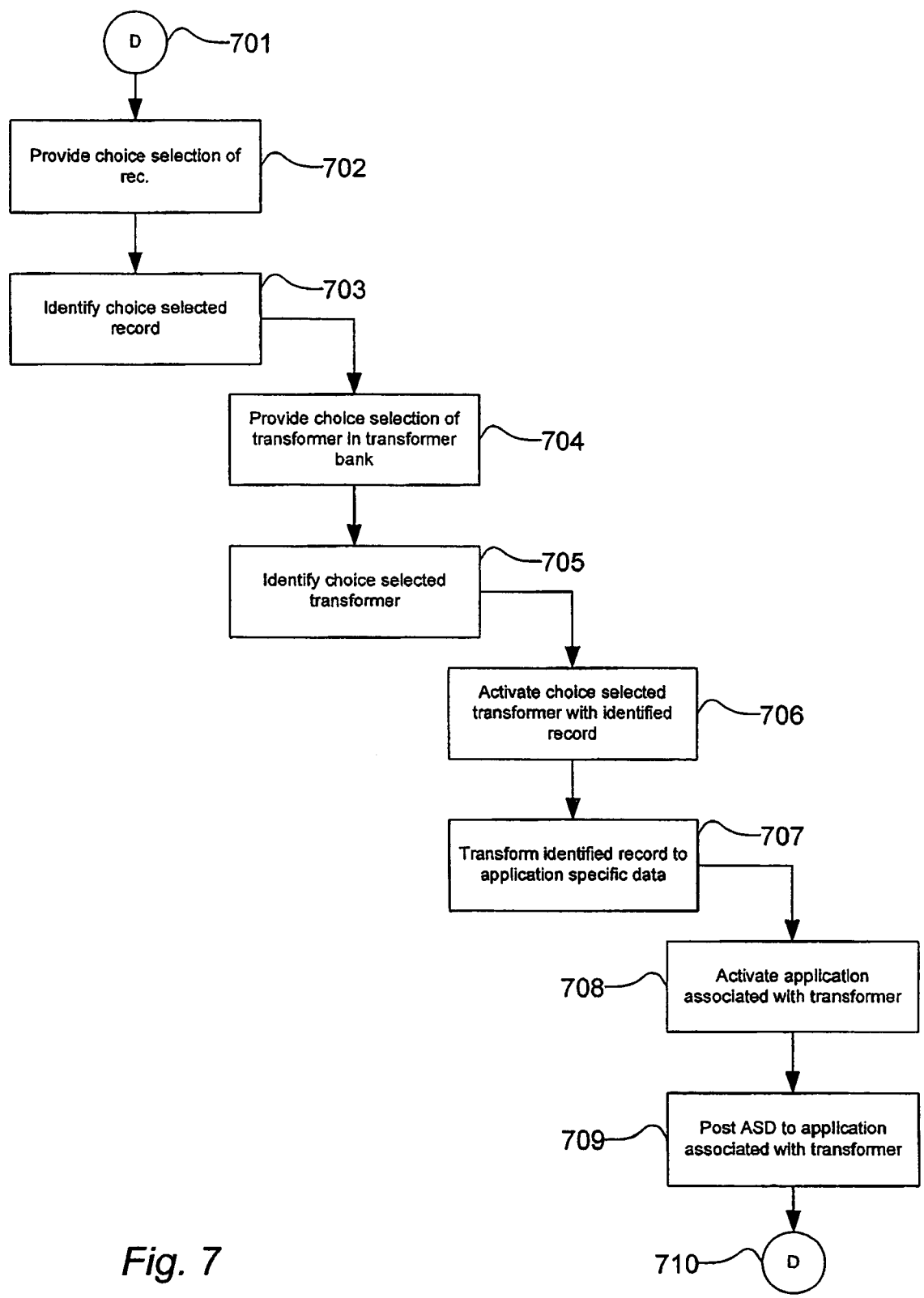
FIG. 7 shows a flow chart of activating an application which receives application specific metadata from the track record.

FIG. 7 shows a flow chart of activating an application which receives application specific metadata from the track record. The flowchart illustrates steps performed in connection with the second situation, described in connection with FIG. 1, where a user retrieves a former request for data, in the form of metadata items, stored in a record. The flowchart has its starting point at point D, 701 which represents a state where records have been provided in a track record memory where they are available for choice selection e.g. by means of the track history view component. In a first step 702 a user is provided with the option of selecting a record which is identified in step 703.

In step 704 a user is provided with the option of selecting a transformer either directly by name or indirectly by the name of an application which is associated with a transformer. In step 705 a selected transformer is identified. Thereby both the record and the transformer are identified.

When both the record and the transformer have been identified the transformer is activated in step 706. Subsequently, in step 707, the identified transformer takes a selected record and transforms the metadata items of the record to application specific data, ASD, according to a syntax determined by the transformer.

When the transformer has provided the application specific data, ASD, an application associated with the transformer can be activated in step 708. In connection with activation of the application associated with the transformer the application specific data, ASD, is transmitted e.g. posted to the application. The ASD are provided according to a syntax which the application can collect and process when it is activated.

The activated application is run as an individual instance and control of the application is assumed by the application itself, an operating system of the system running the application or another application as the case may be.

Figure 8:
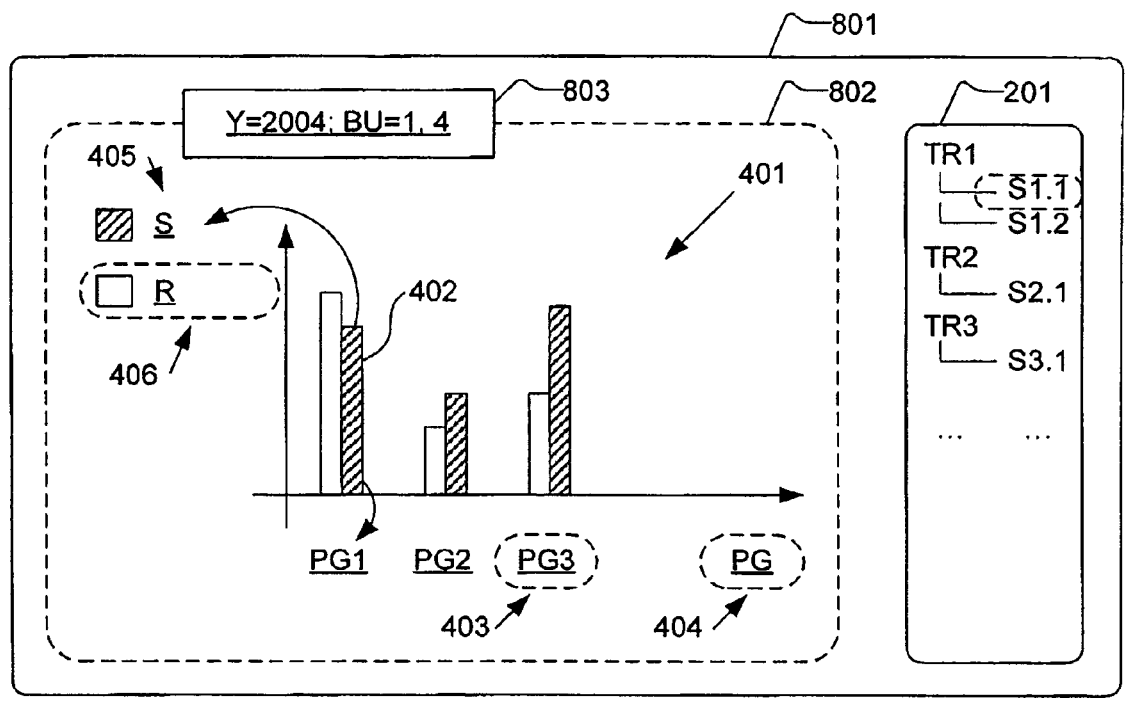
FIG. 8 shows a first view with a single graphical presentation object and a track history tree-view component.

FIG. 8 shows a first view with a single graphical presentation object and a track history. The first view 801 comprises a graphical presentation object 802. The graphical presentation object 802 is shown in the form of a so-called bar-chart wherein the dataset identified by the two measures 'Sales' and 'Revenue' designated by capital letters 'S' and 'R', respectively, are depicted by two different bar types (hatched and not hatched bars). The dataset identified by the two measures are presented along the dimension 'Products' designated 'PG'.

Criteria for identifying the dataset further comprise a first criterion defined by a value of the dimension 'Time' in the statement 'Time(Year)=2004'. A second criterion is defined by values of the dimension 'Product Group' in the statement 'Products(Group)={PG1, PG2, PG3}'. A third criterion is defined by values of the dimension 'Business Unit' in the statement 'BusinessUnit={PG1,PG4}'. The first and third criteria are of a collected type since values of the criteria apply collectively to the entire dataset of the presentation object. The second criteria is of a distributed type since values of the criteria are distributed along the dimension of the presentation. Thus, when the dimension on which the criteria is defined is known and when dimensions of the presentation is known it can be deduced whether a criterion is of collected type or a distributed type.

The graphical presentation object, 802 comprises graphical elements in the form of six individual bars like 402, tick labels 803, an axis label 804 and legends 805, 806. The tick labels 803 displays values (PG1, PG2, PG3) of the distributed criterion. Further, the graphical presentation object 802 comprises a header 803 which display the criteria of the collected type. The graphical elements are preferably bound to respective data items which contain the metadata of the data illustrated by means of the graphical element.

A record like the one shown below has a structure which is configured to handle the metadata and presentation properties of the presentation:

```
<record date="10-10-2004"; no=1; user="BLU">
    <name>My first record</name>
    <descrip>Shows performance in 2004</descrip>
    <view>
        <presentation obj_ID=1>
            <pprop>
                <obj type='barchart';no_ser=2;[layout]/>
            </pprop>
            <pmeta>
                <M>Sales</M>
                <M>Revenue</M>
                <D>ProductGroup</D>
            <pmeta>
        </presentation>
        <action_sequence>
        <action>Time(Year)=2004</action>
        <action>Products(Group)={PG1,PG2,PG3 }</action>
        <action>BusinessUnit={BU1,BU4}</action>
        </action_sequence>
    </view>
</record>
```

The structure of the record above has a first substructure with a scope determined by the tags <view> and </view>. This substructure comprises a second substructure <presentation> and <action_sequence>.

The <presentation> substructure comprises a substructure <pprop> and <pmeta>. <pprop> carries presentation properties with information for rendering a graphical presentation. <pmeta> carries metadata for identifying the dataset by means of measures and dimensions.

The <action_sequence> substructure comprises metadata in the form of criteria for identifying the dataset further.

The record structure above thus comprises metadata which apply to a presentation and metadata which apply to a view. The expediency of this will be described further.

The track history view 201 is described above, but is shown in connection with the graphical presentation object 802 as a component which can be operated to change the content of the graphical presentation object or replace it by another object. The track history view 201 provides choice selection of a record.

Figure 9:
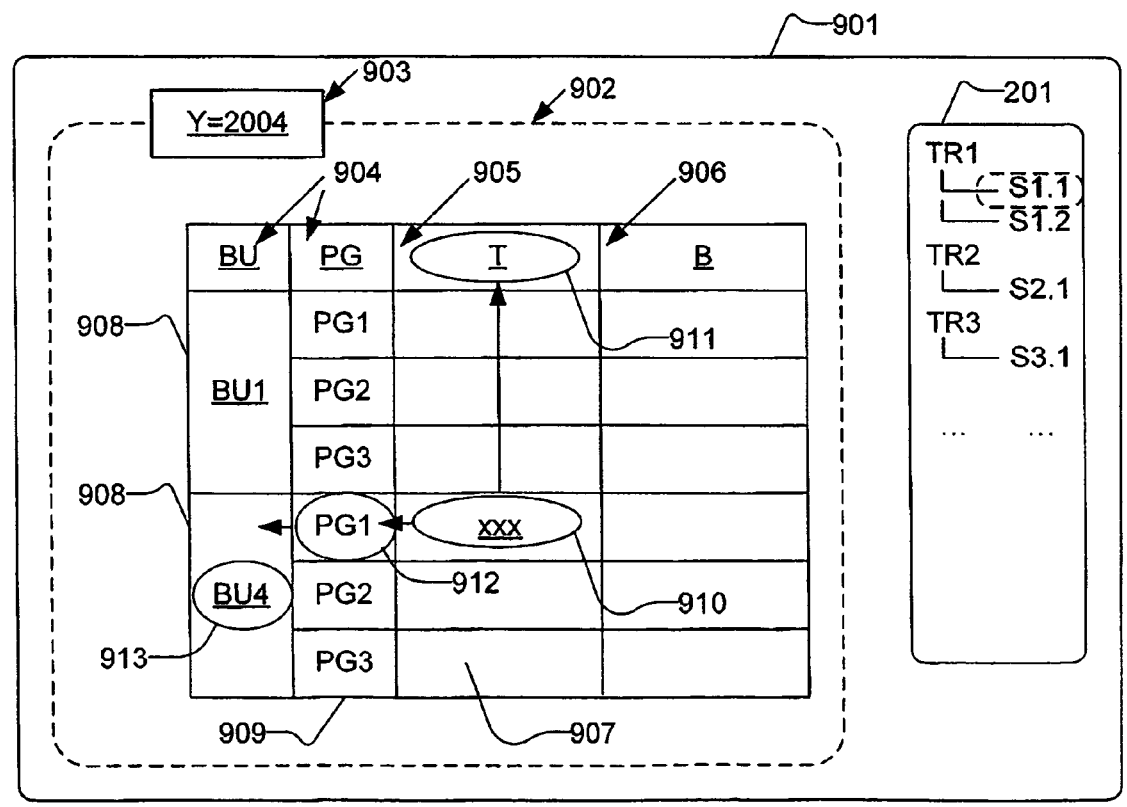
FIG. 9 shows a second view with a single graphical presentation object and a track history tree-view component.

FIG. 9 shows a second view with a single graphical presentation object and a track history. The second view 901 comprises a graphical presentation object 902. Here, the graphical presentation object designated 902 is shown in the form of a table.

The graphical presentation object 902 is shown in the form of a table wherein the dataset identified by the two measures 'Turnover' and 'Budget' designated by capital letters 'T' and 'B', respectively, are depicted in respective columns of the table.

The dataset identified by the two measures are presented along the dimensions 'Products' and 'BusinessUnit' as individual rows of the table and as groups of rows of the table, respectively.

Criteria for identifying the dataset further comprises a first criterion defined by a value of the dimension 'Time' in the statement 'Time(Year)=2004'. A second criterion is defined by values of the dimension 'Product' in the statement 'Products(Group)={PG1, PG2, PG3}'. A third criterion is defined by values of the dimension 'Business Unit' in the statement 'BusinessUnit={PG1,PG4}'. The first criteria are of a collected type since values of the criteria apply collectively to the entire dataset. The second and third criteria is of a distributed type since values of the criteria are distributed along the dimensions of the presentation.

The graphical presentation object 902 comprises graphical elements in the form of individual cells like 907, column header cells 904, 905, 906; row-header cells 908; and group-row-header cells 909.

The column header cells 904 display names 'BU' for 'BusinessUnit' and 'P' for 'ProductGroup' of the dimensions along which the measures are presented. The column header cells 905 and 906 display names 'T' and 'B' of the measures 'Turnover' and 'Budget' identifying the dataset. The row-header cells 909 display values (PG1, PG2, PG3) of one of the distributed criteria. The group-row-header cells 908 displays values (BU1, BU4) of the other of the distributed criteria.

A record like the one shown below has a structure which is configured to handle the metadata and presentation properties of the presentation:

```
<record date="10-10-2004"; no=1; user="BLU">
    <name>My second record</name>
    <descrip>Shows performance in 2004</descrip>
    <view>
        <presentation obj_ID=1>
            <pprop>
                <obj type='table';no_ser=2;[layout]/>
            </pprop>
            <pmeta>
```

-continued

```
                <M>Turnover</M>
                <M>Budget</M>
                <D>BusinessUnit</D>
                <D>Product</D>
            <pmeta>
        </presentation>
        <action_sequence>
    <action>Time(Year)=2004</action>
    <action>Products(Group)={PG1,PG2,PG3}</action>
    <action>BusinessUnit={BU1,BU4}</action>
        </action_sequence>
    </view>
</record>
```

The structure of the record above is described above.

The track history tree-view component 201 is configured to provide a user with the option of choice selecting a record and additionally a (menu) option of selecting an application which is the target for the record via a transformer. In the below different applications of records are described:

Application 1: Current View with Former View Criteria. CV-FVC

When the option of selecting a former record, e.g. 'My first record' shown above in connection with FIG. 8, is selected and the application of applying criteria of that selected record is selected, a transformation of the selected record is performed.

The selected record is transformed by, firstly, filtering out information of individual presentations of the view described by the record. That is, information within any <presentation> structures. Thereby, after filtering, the record contains an identification of a dataset by means of criteria of the record. This is shown by the below fraction of the former record:

```
<record date="10-10-2004"; no=1; user="BLU">
    ...
    <vmeta>
        <crit>Time(Year)=2004</crit>
        <crit>Products(Group)={PG1,PG2,PG3}</crit>
        <crit>BusinessUnit={BU1,BU4}</crit>
    </vmeta>
    ...
</record>
```

The current view is described by the below fraction of the record:

```
<record date="11-10-2004"; no=2; user="BLU">
    <name>My first record</name>
    <descrip>Shows performance in 2004</descrip>
    <view>
        <presentation PID=1>
            <pprop>
                <obj type='table';no_ser=2;[layout]/>
            </pprop>
            <pmeta>
                <M>Turnover</M>
                <M>Budget</M>
                <D>BusinessUnit</D>
                <D>Product</D>
            <pmeta>
        </presentation>
        ...
    </view>
</record>
```

This record identifies the dimension "Business Units" and two measures "Turnover" and "Budget"; the criteria for the dataset and the presentation properties stating among other parameters the object type being of the table type.

Application 2: Former View with Current View Criteria, FV-CVC

When the option of selecting a former record, e.g. 'My first record' shown above in connection with FIG. 8, is selected and the application of applying a presentation of that selected record is selected, a transformation of the selected record is performed.

The selected record is transformed by, firstly, filtering out information of individual presentations of the view described by the record. That is, information within any <presentation> structures. Thereby, after filtering, the record contains an identification of a dataset by means of criteria of the record.

Application 3: Recall Former View: FV

When the option of selecting a former record is selected the selected record can be interpreted without any transformation i.e. the presentation properties and metadata are read to interpret the former view of the former record.

Figure 10:
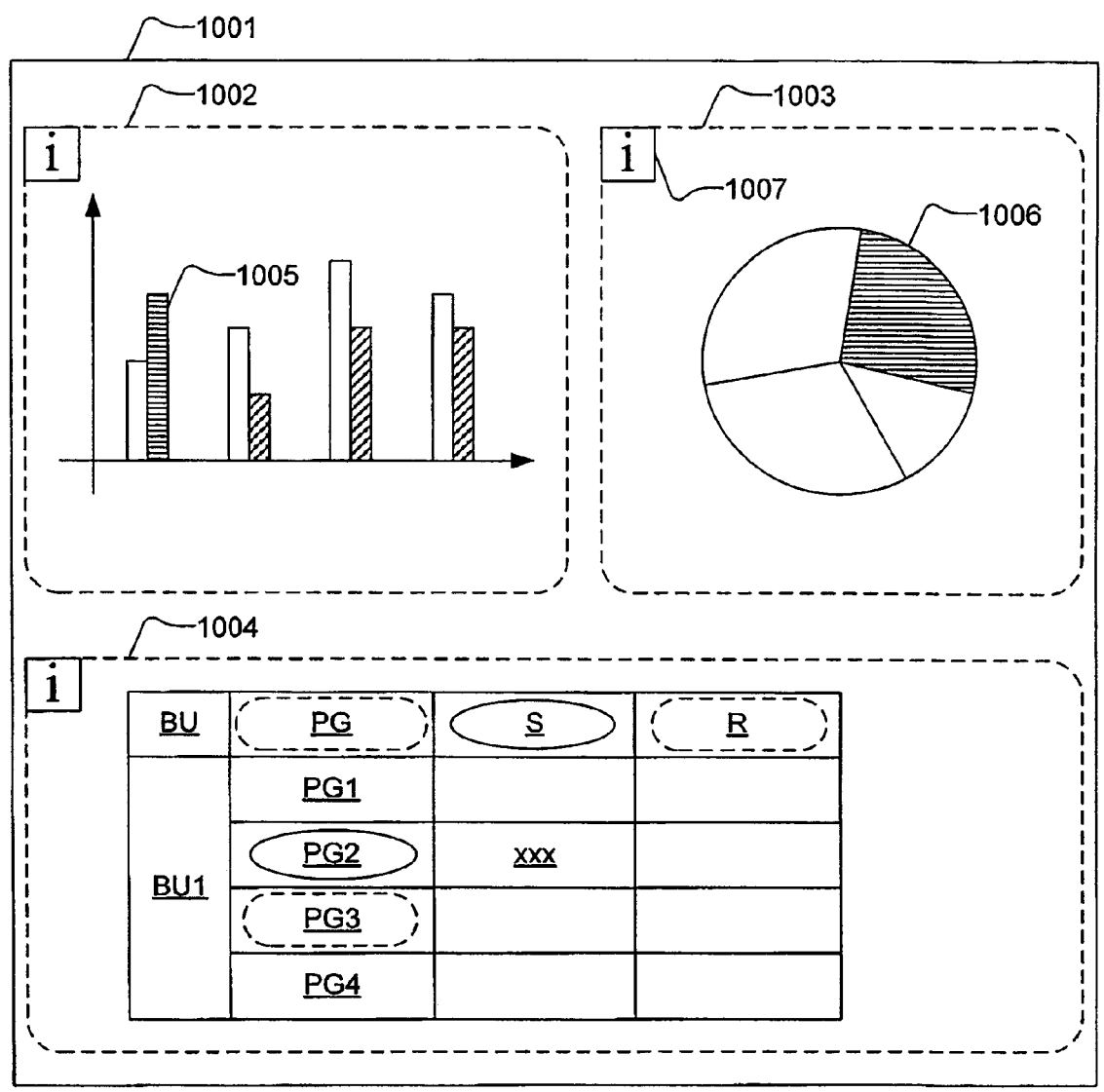
FIG. 10 shows a third view with multiple graphical presentation objects.

Turning now to an aspect of providing an interactive specification of metadata and especially metadata of the criteria type for further and/or updated presentations. This interactive specification of metadata will be referred to in connection with FIG. 10 where a view structure of multiple graphical presentation objects is described and in connection with FIG. 12 where a method of responding to an interactive specification of metadata is described.

The graphical element 905 is bound to a data item which provides the value of the column header, which in this case is the capital letter 'T' designating a measure denoted 'Turnover'. Likewise, the graphical element 906 is bound to a data item which provides the value of a capital 'B' which also designates a measure, but denoted 'Budget'. The information on 'T' or 'Turnover' or 'B' or 'Budget' need not be contained in the report itself, but can be provided by the database or any other application.

The graphical elements 909 are bound to data items which provide the value of the row headers. In this case, the values are given somewhat anonymous values: 'PG1', 'PG2' and 'PG3'. These values can be short for 'Product Group 1', 'Product Group 2' etc. In this case, the cells designate values of a dimension i.e. so-called 'dimension values' or criteria. The graphical elements 908 are bound to data items which provide the value of the group row headers ('BU1' and 'BU4'). The graphical elements 904 are bound to data items which provide a value 'PG' and 'BU', respectively, which are short for 'Product Group' and 'Business Unit' and which designate the dimensions of which the cells in the below columns are dimension values.

The remaining twelve cells designated in common by reference numeral 907 designate cells or graphical elements bound to data items which provide figures, typically numbers, as the result of a specified analysis. However, the metadata that apply to the element (in the form of the table cell) can be determined according to a spatial scope of metadata items. The metadata that apply to the element 910 is defined by a spatial (column) scope of the metadata item bound to the column header 905 and by the spatial (row) scope of the metadata item bound to the row header 912 which in turn is covered by the spatial (group row) scope of the metadata item bound to the group row header 913. Similarly, scopes of metadata can be determined for other graphical presentation objects such as pie-charts, bar-graphs etc.

The further graphical element 903, in the form of a table header is also bound to a data item, but proving a criterion which applies to the entire result displayed in the table. This data item thus provides a collected criterion for the presentation object 902.

Thereby a structure is provided which enables determination of which metadata items that are bound to a specific graphical element in response to a user's directed action to such a graphical element.

Figure 11:
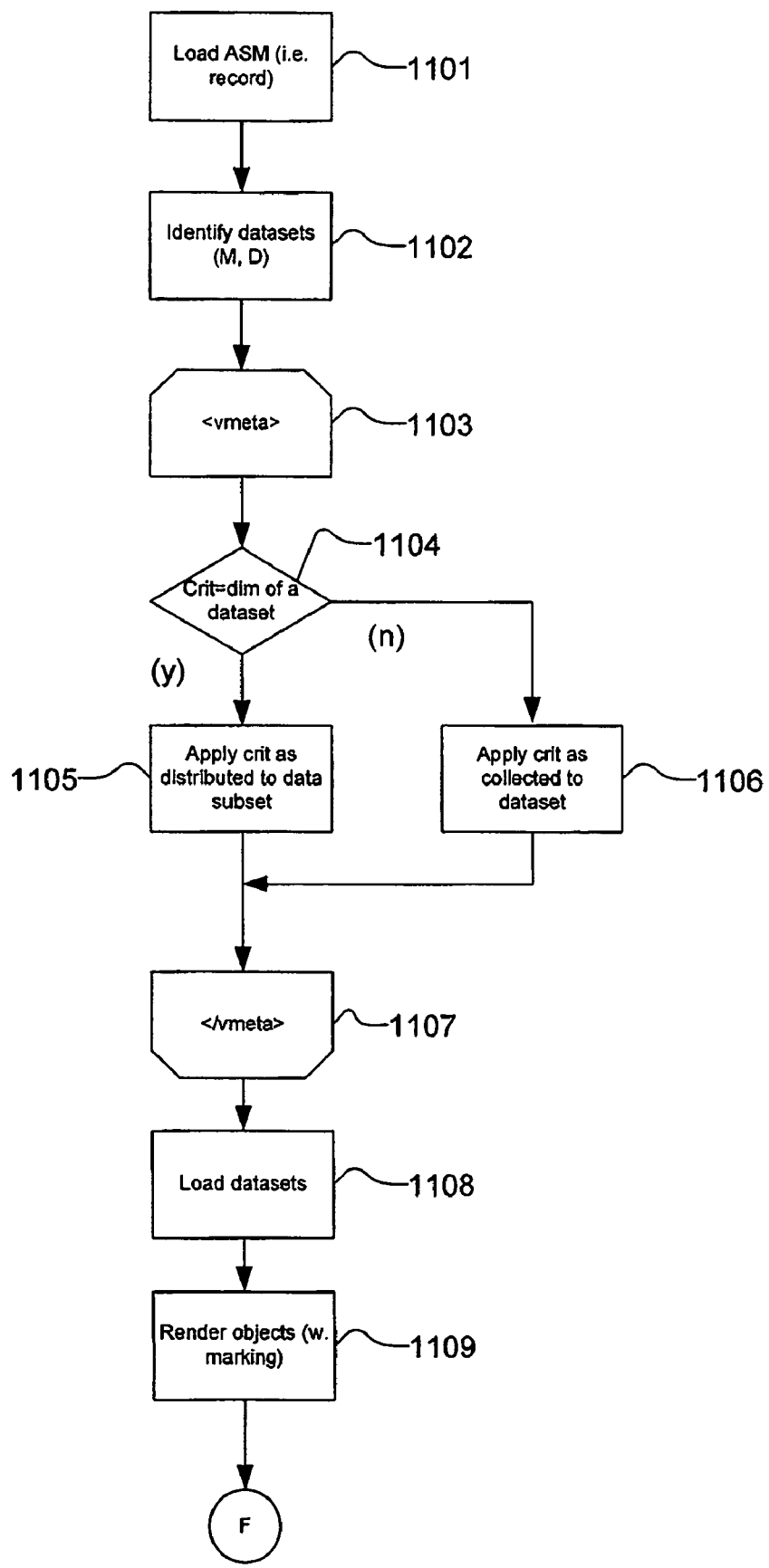
FIG. 11 shows a flowchart of loading a record to provide a view.

FIG. 11 shows a flowchart of loading a record to provide a view. The view structure 1001 comprises a first graphical presentation object 1002 of a bar-graph type showing the measures 'Sales' and 'Revenue' along the dimension 'Time'.

Further, the view structure 1001 comprises a second graphical presentation object 1003 of a pie-chart type showing the measure 'Sales' along the dimension 'Business Unit'.

Still further, the view structure 1002 comprises a third graphical presentation object 1004 of a table type showing the measures 'Turnover' and 'Budget' along the dimensions 'Business Unit' and 'Products'.

The view is obtained under situation 1 described in connection with FIG. 1, where a question is input to identify the metadata items of the view. Alternatively, a previously used view is re-established from partial information of the metadata, given in the question. Yet, alternatively, the view is provided by recalling a former view, FV.

Analytical Flow

In the following, a sequence of analytical steps activated by a user is described in connection with presentation of data subsets in a view.

While the view is presented on an interactive interface, a user can perform an action directed to an element of a graphical presentation object of the view. The element is configured to raise a so-called click-event in response to a detected action of e.g. a user clicking a mouse-button while pointing at the element with a mouse-curser.

In response to the action, it is firstly detected which element the action is directed at and secondly, an event of the element is raised. In response to such an event, it is detected which data item that is bound to the element and the value of the data item is read. The value is interpreted as a criterion.

This criterion of the element, e.g. the element 1005, is applied as a collected criterion for the presentation objects 1003 and 1004. That is, a first object is selected and the criterion is applied to further presentation objects of the view. Further, the element 1005 is marked to distinguish it from other elements of the presentation. Moreover, the presentation object can be marked to distinguish it from other presentation objects of the view and to thereby indicate that an action has been directed to an (marked) element of that (marked) presentation.

A record representing the view is updated or re-instantiated to record the directed action of the presentation object and the action's effect on the other presentation objects. The below fraction shows a record where a structure encapsulated by the tags <action_sequence> and </action_sequence> comprises a specification of the action by the criterion associated with the elected element of the presentation object.

```
<record date="11-10-2004"; no=2; user="BLU">
  ...
  <view>
    <presentation PID=1>
      ...
```

-continued

```
</presentation>
...
<action_sequence>
    <action>Time(qyear)=Q1,2004</action>
    ...
</action_sequence>
</view>
</record>
```

Thereby, the result of a first analytical step is recorded.

A second analytical step is initiated by a user performing an action directed to an element 1006 of another graphical presentation object 1003 of the view 1001. The element 1006 is bound to the criterion of the dimension 'Business Unit' being equal to 'BU1'. In response to the action, the element is marked and the record is updated or re-instantiated accordingly. A specification of the action is recorded by the criterion associated with the elected element of the presentation object. The criterion is enclosed by the tags <action> and </action>. This is illustrated in the below fraction:

```
...
<action_sequence>
    <action>Time(qyear)=Q1,2004</action>
    <action>BusinessUnit='BU1'</action>
</action_sequence>
...
```

Thereby, the result of a further, second analytical step is recorded.

The criterion of the element 1006, is applied as a collected criterion for the presentation object 1004. That is, additionally, a second object is selected and the criterion is applied to further presentation objects (i.e. the presentation object 1004) of the view.

The analytical sequence can be continued or resumed while illustrating the analytical sequence by marking the elements and recording a specification of the analytical sequence.

The analytical steps are described in a record comprising the following fraction:

```
<ActionSequence>
    <action>Time(year quarters)=Q1,2004</action>
    <action>BusinessUnit=1</action>
</ActionSequence>
```

FIG. 11 shows a flowchart of loading a record to provide a view. The record is provided as application specific data, ASD, from a transformer or directly from the track history. The record is loaded in step 1101 in response to being selected.

Individual data subsets are identified by dimensions and measures of individual presentations, respectively, in step 1102.

A loop encapsulated by steps 1103 and 1109 interprets individual ones of the action segments of the record. The action segments are interpreted in order of appearance in the record. In step 1104 it is examined whether a criterion (i.e. a value, range etc. of a dimension) in an action segment is a dimension of a data subset. If the criterion is not a dimension of a data subset (n), the criterion is applied as a collected criterion of the data subset in step 1106.

Alternatively (y), the criterion is applied as a distributed criterion to the matching dimension of the respective presentation object in step 1105.

When the action sequence segment of the record has been processed the loop is finished and the individual data subsets are identified completely. Thus, in step 1108 the data subsets are loaded. Subsequently, in step 1109 the presentation objects are rendered with presentation properties and contents as specified in the record.

Figure 12:
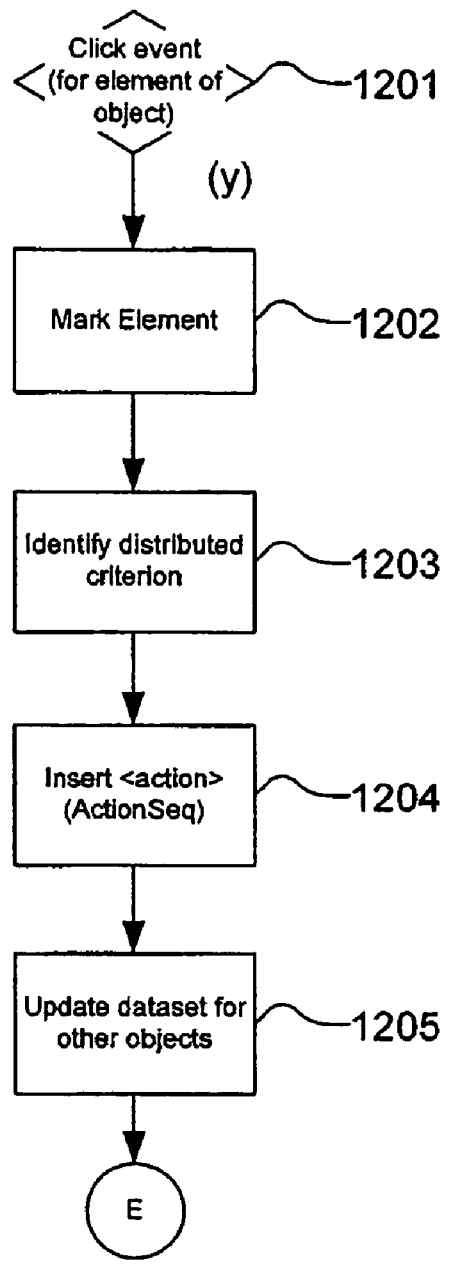
FIG. 12 shows a flowchart of generating an action sequence.

FIG. 12 shows a flowchart of generating an action sequence. A directed action to an element of a presentation object raises a click-event of the element. In step 1201 it is examined whether a click-event is detected, and in the affirmative event (y), a series of steps is performed to bring a sequence of analytical steps on to a further step. In step 1202 the element is marked to distinguish it from other elements of the presentation which comprises the element. In step 1203 the criterion associated with the element is identified. This criterion is appended to the end of a sequence of action segments in the record representing the current view.

In step 1205 data subsets of presentations which do not comprise dimensions which match with criteria (i.e. values or ranges of dimensions) are updated to be further identified by the collected criterion associated with the element.

Figure 13:
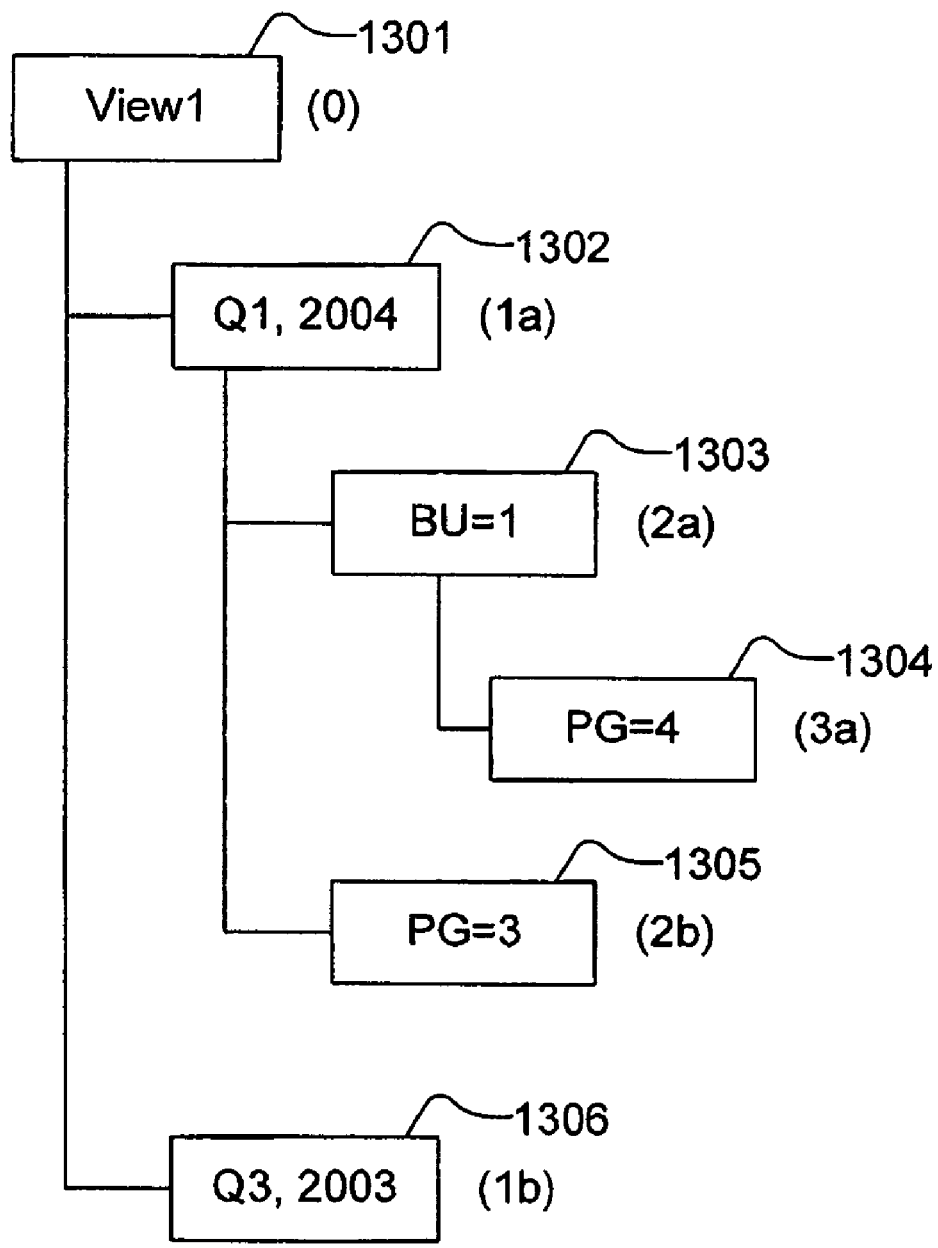
FIG. 13 shows a track history tree-view.

FIG. 13 shows a track history tree-view. The tree-view comprises a parent node 1301. This node is created when a view is presented and a record representing the view is stored. When a user interacts with the view and specifies a criterion e.g. by clicking a graphical element of first presentation to provide the criterion as a distributed criterion on a dimension of a first presentation, a second node 1302 is created. A record comprising this criterion is created or an existing record is updated.

If the user continues to interact with the view in the same way, a further node 1303 is created. This node is created in response to an element of another presentation object clicked to provide the criterion as a distributed criterion on a dimension of a second presentation.

The user continues to interact with the view in the same way, and a still further node 1304 is created. This node 1304 is created in response to an element of another presentation object being clicked to provide the criterion as a distributed criterion on a dimension of a third presentation.

The node 1305 represents the situation where the user returns to the second presentation, but now clicks another element than before.

The node 1306 represents the situation that the user returns to the first presentation, but now clicks another element of that first presentation.

Thereby, information for tracking an analytical process is established. In connection with the above, views of the analytical steps of the process can be re-established and combined to provide a view under different formerly used criteria. Especially, metadata of the views can be provided as application specific metadata.

In a preferred embodiment, a user is provided with the option of supplying a description of the view or presentation to register comments thereto. The structure of the records is therefore preferably provided with a segment for comments e.g. enclosed by tags <comment> and </comment>.

In practical embodiments, it may be expedient to store presentation properties in individual presentation property records and to provide a link or relation from a track history record to a presentation property record. Thereby, data redundancy can be reduced.

In the above it should be noted that the term 'metadata items' comprises: measures and/or dimensions and/or measures and dimensions and/or criteria and/or measures and criteria and/or dimensions and criteria and/or measures and dimensions and criteria.

The term 'further identification' or 'identified further' relates to identification of a dataset in a further of more than one instance, whereby, in a first instance, the dataset is identified by e.g. a measure and a dimension and, in a second instance, by a criteria or dimension value. Alternatively, the order of the identifications of the first and second instance is reversed. Moreover, additional instances of 'further identification' can be referred to (e.g. firstly a measure, then a dimension and then a criterion).

Further, in the above it should be noted that the term 'presentation properties' designates any type of properties related to presentations. Therefore, in practical embodiments, different definitions of which 'presentation properties' that are stored in 'track history records' or 'presentation property records' can be applied. Typically, at least some presentation properties will be determined by or carried with graphical presentation objects.

It should be noted that the above description of a method can be implemented by a computer system with a memory loaded with a program that is configured to perform the method. Preferably, the computer system has a structure, when loaded with the program, as described above. However, it will be within the skills of person skilled in the art to use other suitable structures for performing the method.

Although an XML record structure has been described in the above, this description is not completely conforming to the XML standard as specified by the World Wide Web Consortium (www.w3.org), but it is within the skills of a computer programmer to provide an implementation given the description above. Other record structures and other technologies e.g. relational databases can be applied to implement storage and retrieval of track history records.

A program that is configured to perform the computer-implemented method as described above when run by a computer, can be distributed by means of a CD-ROM, DVD or other hard media or alternatively as a download signal via a computer network.

The invention claimed is:

1. A computer-implemented method of providing a track history of information previously requested from a database, the method comprising:
   providing, in a computer-readable storage memory, a track history of user-selectable records, said records having corresponding metadata items applicable to identify a data set from a data superset stored in the database;
   providing a bank of user-selectable transformers, wherein a selected transformer takes a selected record and transforms the metadata items corresponding to the selected record to application-specific metadata according to a syntax determined by the selected transformer; and
   providing activation of an application which accepts the determined syntax, said activation making the application-specific metadata available for use in rendering a presentation of the identified data set by the application.

2. The method according to claim 1, wherein:
   a first of the transformers is configured to provide the application-specific metadata using a first syntax which is determined by a transformation embedding the metadata items of the record in an information body text; and
   a first application, which accepts the specified syntax, provides a presentation that combines the information body text and the application-specific metadata.

3. The method according to claim 1, wherein the information body text is provided in a natural language.

4. The method according to claim 1, wherein the information text is supplemented by a user's description.

5. The method according to claim 1, wherein the records further comprise presentation properties which define properties of the presentation of the data set by means of a graphical object specified by the properties.

6. The method according to claim 1, wherein:
   the records further comprise presentation properties which define properties of a presentation of a data set by means of a graphical object specified by the properties; and
   the method further comprises providing the presentation of the data set by means of the specified graphical object in accordance with the presentation properties.

7. The method according to claim 6, wherein:
   a second of the transformers is configured to provide the application-specific metadata from the metadata items and the presentation properties of a selected record; and
   a second application provides a presentation of the data set, identified by the metadata items of the selected record, by means of a graphical object in accordance with the presentation properties of the record.

8. The method according to claim 1, wherein:
   the records further comprise presentation properties which define properties of a presentation; and
   the method further comprises merging metadata and presentation properties from a record representing a current view and a selected record representing a former view.

9. The method according to claim 1, comprising:
   retrieving metadata items of a selected record;
   retrieving presentation properties of a record that represents a current view; and
   providing the presentation of the data set identified by the retrieved metadata items according to presentation properties retrieved from the record that represents the current view.

10. The method according to claim 9, wherein the metadata items of a selected record are items of a type-setting criteria in identifying a user correlated data subset of the data set.

11. The method according to claim 10, further comprising:
    retrieving metadata items of a dimensions type and a measures type from a record representing a current view,
    wherein the data set identified by the metadata items of the selected record is further identified by the metadata items of the dimensions type and the measures type from the record representing a current view.

12. The method according to claim 10, wherein:
    a record comprises criteria, and
    a current presentation comprises a view structure of multiple graphical presentation objects each providing a presentation of a data subset which is partially identified by an individual criterion,
    the method comprising:
       applying criteria of the record to each of the data subsets to change the identification of the data subsets; and
       updating the current presentation to provide a presentation of the data subsets as identified by the changed identification.

13. The method according to claim 10, wherein:
    a selected record comprises subsets of metadata items with respective criteria, and
    a current presentation comprises a view structure of multiple graphical objects each providing a presentation of a data subset which is partially identified by an individual criterion;

the method comprising:

changing an identification of the data subset of the presentation by application of a respective subset of metadata items of the criteria type in the selected record;

updating the presentation of the current presentation to provide a presentation of the data subsets as identified by the changed identifications.

14. The method according to claim 9, wherein:

a third transformer is configured to provide the application-specific metadata from a selected record and a representation of current presentation properties which are provided by a current presentation; and a third application provides a presentation of the data set identified by the selected record in accordance with the representation of current presentation properties.

15. The method according to claim 1, wherein:

a fourth transformer is configured to provide the application-specific metadata, and a fourth application provides changed values of the data set according to a specification of the changes provided in the application-specific metadata.

16. The method according to claim 1, wherein:

a fifth transformer is configured to provide the application-specific metadata, and a fifth application provides search results in response to search criteria provided in the application-specific metadata.

17. The method according to claim 1, wherein:

a current presentation comprises a view structure of multiple graphical objects each providing a presentation of a respective data subset; and a graphical object comprises multiple graphical elements, which are associated with metadata items that define criteria for the data of the data subset, represented by means of the elements;

the method comprising:

in response to a user's directed action to a graphical element of a graphical object, determining those metadata that applies to the graphical element, and retrieving further data defined by the determined metadata; and making a presentation of the further data by means of a graphical object of the view structure.

18. The method according to claim 17, wherein, in response to a user's directed action to the graphical element of the graphical object, the graphical element is enhanced visually relative to other elements of the graphical object to reflect that the element represents a criterion for the data presented by means of the further graphical object.

19. A computer system with a computer-readable memory device loaded with a program that is configured to perform the computer-implemented method according to claim 1 when run by the computer system.

20. A computer-readable storage medium encoded with a program that is configured to perform the computer-implemented method according to claim 1 when run by a computer.

21. A system comprising:

a display device;

a processor; and a computer-readable storage medium storing program instructions that, when executed by the processor, configure the system to perform a method for providing a graphical presentation based on a track history of previously requested information, the method comprising:

receiving a user-selection of one of a plurality of stored track history records having corresponding metadata items and presentation properties, wherein:

said metadata items identify a stored data set categorized by one or more measures representing amounts, and by one or more dimensions along which the measures are arrayed, and said presentation properties define graphical properties of the data set;

receiving a user-selection of one of a plurality of stored transformations; transforming, using the selected transformation, the metadata items corresponding to the selected record to application-specific metadata according to a syntax determined by the selected transformation; and activating an application configured to accept the determined syntax, said activation providing a graphical presentation of the data set identified by the metadata items on the display device based on the application-specific metadata and the presentation properties.

* * * * *